US009242309B2

(12) United States Patent
Zediker et al.

(10) Patent No.: US 9,242,309 B2
(45) Date of Patent: Jan. 26, 2016

(54) TOTAL INTERNAL REFLECTION LASER TOOLS AND METHODS

(71) Applicant: Foro Energy Inc., Littleton, CO (US)

(72) Inventors: Mark S. Zediker, Castle Rock, CO (US); Brian O. Faircloth, Evergreen, CO (US); Sharath K. Kolachalam, Highlands Ranch, CO (US); Daryl L. Grubb, Houston, TX (US)

(73) Assignee: FORO ENERGY INC., Houston, TX (US)

( * ) Notice: Subject to any disclaimer, the term of this patent is extended or adjusted under 35 U.S.C. 154(b) by 275 days.

(21) Appl. No.: 13/768,149

(22) Filed: Feb. 15, 2013

(65) Prior Publication Data

US 2013/0228557 A1     Sep. 5, 2013

Related U.S. Application Data

(60) Provisional application No. 61/605,434, filed on Mar. 1, 2012, provisional application No. 61/755,745, filed on Jan. 23, 2013.

(51) Int. Cl.
*B23K 26/064* (2014.01)
*E21B 7/15* (2006.01)
*B23K 26/00* (2014.01)
*B23K 26/06* (2014.01)

(52) U.S. Cl.
CPC ............. *B23K 26/00* (2013.01); *B23K 26/0652* (2013.01); *B23K 26/1462* (2015.10); *E21B 7/15* (2013.01)

(58) Field of Classification Search
CPC .. G02B 5/04; B23K 26/0652; B23K 26/1458; H01S 3/0064; E21B 7/14; E21B 7/15
See application file for complete search history.

(56) References Cited

U.S. PATENT DOCUMENTS

| | | |
|---|---|---|
| 914,636 A | 3/1909 | Case |
| 2,548,463 A | 4/1951 | Blood |
| 2,742,555 A | 4/1956 | Murray |
| 3,122,212 A | 2/1964 | Karlovitz |
| 3,383,491 A | 5/1968 | Muncheryan |
| 3,461,964 A | 8/1969 | Venghiattis |
| 3,493,060 A | 2/1970 | Van Dyk |
| 3,503,804 A | 3/1970 | Schneider et al. |
| 3,539,221 A | 11/1970 | Gladstone |
| 3,544,165 A | 12/1970 | Snedden |

(Continued)

FOREIGN PATENT DOCUMENTS

| | | |
|---|---|---|
| EP | 0 295 045 A2 | 12/1988 |
| EP | 0 515 983 A1 | 12/1992 |

(Continued)

OTHER PUBLICATIONS

U.S. Appl. No. 12/543,986, filed Aug. 19, 2009, Moxley et al.

(Continued)

*Primary Examiner* — Geoffrey S Evans
(74) *Attorney, Agent, or Firm* — Glen P. Belvis; Steptoe & Johnson

(57) ABSTRACT

There is provided high power laser tools and laser heads that utilize total internal reflection ("TIR") structures to direct the laser beam along a laser beam path within the TIR structure. The TIR structures may be a TIR prism having its hypotenuse as a TIR surface.

29 Claims, 7 Drawing Sheets

(56) References Cited

U.S. PATENT DOCUMENTS

| | | | |
|---|---|---|---|
| 3,556,600 A | 1/1971 | Shoupp et al. | |
| 3,574,357 A | 4/1971 | Tirgoviste et al. | |
| 3,586,413 A | 6/1971 | Adams | |
| 3,652,447 A | 3/1972 | Yant | |
| 3,693,718 A | 9/1972 | Stout | |
| 3,699,649 A | 10/1972 | McWilliams | |
| 3,802,203 A | 4/1974 | Ichise et al. | |
| 3,820,605 A | 6/1974 | Barber et al. | |
| 3,821,510 A | 6/1974 | Muncheryan | |
| 3,823,788 A | 7/1974 | Garrison et al. | |
| 3,871,485 A | 3/1975 | Keenan, Jr. | |
| 3,882,945 A | 5/1975 | Keenan, Jr. | |
| 3,938,599 A | 2/1976 | Horn | |
| 3,960,448 A | 6/1976 | Schmidt et al. | |
| 3,977,478 A * | 8/1976 | Shuck | E21B 7/15 219/121.84 |
| 3,992,095 A | 11/1976 | Jacoby et al. | |
| 3,998,281 A | 12/1976 | Salisbury et al. | |
| 4,019,331 A | 4/1977 | Rom et al. | |
| 4,025,091 A | 5/1977 | Zeile, Jr. | |
| 4,026,356 A | 5/1977 | Shuck | |
| 4,046,191 A | 9/1977 | Neath | |
| 4,047,580 A | 9/1977 | Yahiro et al. | |
| 4,057,118 A | 11/1977 | Ford | |
| 4,061,190 A | 12/1977 | Bloomfield | |
| 4,066,138 A | 1/1978 | Salisbury et al. | |
| 4,090,572 A | 5/1978 | Welch | |
| 4,113,036 A | 9/1978 | Stout | |
| 4,125,757 A | 11/1978 | Ross | |
| 4,151,393 A | 4/1979 | Fenneman et al. | |
| 4,162,400 A | 7/1979 | Pitts, Jr. | |
| 4,189,705 A | 2/1980 | Pitts, Jr. | |
| 4,194,536 A | 3/1980 | Stine et al. | |
| 4,199,034 A | 4/1980 | Salisbury et al. | |
| 4,227,582 A | 10/1980 | Price | |
| 4,228,856 A | 10/1980 | Reale | |
| 4,243,298 A | 1/1981 | Kao et al. | |
| 4,249,925 A | 2/1981 | Kawashima et al. | |
| 4,252,015 A | 2/1981 | Harbon et al. | |
| 4,256,146 A | 3/1981 | Genini et al. | |
| 4,266,609 A | 5/1981 | Rom et al. | |
| 4,280,535 A | 7/1981 | Willis | |
| 4,281,891 A | 8/1981 | Shinohara et al. | |
| 4,282,940 A * | 8/1981 | Salisbury | E21B 7/15 219/121.6 |
| 4,332,401 A | 6/1982 | Stephenson et al. | |
| 4,336,415 A | 6/1982 | Walling | |
| 4,340,245 A | 7/1982 | Stalder | |
| 4,367,917 A | 1/1983 | Gray | |
| 4,370,886 A | 2/1983 | Smith, Jr. et al. | |
| 4,374,530 A | 2/1983 | Walling | |
| 4,375,164 A | 3/1983 | Dodge et al. | |
| 4,389,645 A | 6/1983 | Wharton | |
| 4,415,184 A | 11/1983 | Stephenson et al. | |
| 4,417,603 A | 11/1983 | Argy | |
| 4,436,177 A | 3/1984 | Elliston | |
| 4,444,420 A | 4/1984 | McStravick et al. | |
| 4,453,570 A | 6/1984 | Hutchison | |
| 4,459,731 A | 7/1984 | Hutchison | |
| 4,477,106 A | 10/1984 | Hutchison | |
| 4,504,112 A | 3/1985 | Gould et al. | |
| 4,522,464 A | 6/1985 | Thompson et al. | |
| 4,531,552 A | 7/1985 | Kim | |
| 4,533,814 A | 8/1985 | Ward | |
| 4,565,351 A | 1/1986 | Conti et al. | |
| 4,662,437 A | 5/1987 | Renfro | |
| 4,694,865 A | 9/1987 | Tauschmann | |
| 4,725,116 A | 2/1988 | Spencer et al. | |
| 4,741,405 A | 5/1988 | Moeny et al. | |
| 4,770,493 A | 9/1988 | Ara et al. | |
| 4,774,420 A | 9/1988 | Sutton | |
| 4,793,383 A | 12/1988 | Gyory et al. | |
| 4,830,113 A | 5/1989 | Geyer | |
| 4,860,654 A | 8/1989 | Chawla et al. | |
| 4,860,655 A | 8/1989 | Chawla | |
| 4,872,520 A | 10/1989 | Nelson | |
| 4,896,015 A * | 1/1990 | Taboada et al. | 219/121.78 |
| 4,924,870 A | 5/1990 | Wlodarczyk et al. | |
| 4,952,771 A | 8/1990 | Wrobel | |
| 4,989,236 A | 1/1991 | Myllymäki | |
| 4,997,250 A | 3/1991 | Ortiz, Jr. | |
| 5,003,144 A | 3/1991 | Lindroth et al. | |
| 5,004,166 A | 4/1991 | Sellar | |
| 5,033,545 A | 7/1991 | Sudol | |
| 5,049,738 A | 9/1991 | Gergely et al. | |
| 5,084,617 A | 1/1992 | Gergely | |
| 5,086,842 A | 2/1992 | Cholet | |
| 5,107,936 A | 4/1992 | Foppe | |
| 5,121,872 A | 6/1992 | Legget | |
| 5,125,061 A | 6/1992 | Marlier et al. | |
| 5,125,063 A | 6/1992 | Panuska et al. | |
| 5,128,882 A | 7/1992 | Cooper et al. | |
| 5,140,664 A | 8/1992 | Bosisio et al. | |
| 5,163,321 A | 11/1992 | Perales | |
| 5,168,940 A | 12/1992 | Foppe | |
| 5,172,112 A | 12/1992 | Jennings | |
| 5,212,755 A | 5/1993 | Holmberg | |
| 5,216,222 A * | 6/1993 | Masuda | 219/121.78 |
| 5,269,377 A | 12/1993 | Martin | |
| 5,285,204 A | 2/1994 | Sas-Jaworsky | |
| 5,348,097 A | 9/1994 | Giannesini et al. | |
| 5,351,533 A | 10/1994 | Macadam et al. | |
| 5,353,875 A | 10/1994 | Schultz et al. | |
| 5,355,967 A | 10/1994 | Mueller et al. | |
| 5,356,081 A | 10/1994 | Sellar | |
| 5,396,805 A | 3/1995 | Surjaatmadja | |
| 5,411,081 A | 5/1995 | Moore et al. | |
| 5,411,085 A | 5/1995 | Moore et al. | |
| 5,411,105 A | 5/1995 | Gray | |
| 5,413,045 A | 5/1995 | Miszewski | |
| 5,413,170 A | 5/1995 | Moore | |
| 5,419,188 A | 5/1995 | Rademaker et al. | |
| 5,423,383 A | 6/1995 | Pringle | |
| 5,425,420 A | 6/1995 | Pringle | |
| 5,435,351 A | 7/1995 | Head | |
| 5,435,395 A | 7/1995 | Connell | |
| 5,463,711 A | 10/1995 | Chu | |
| 5,465,793 A | 11/1995 | Pringle | |
| 5,469,878 A | 11/1995 | Pringle | |
| 5,479,860 A | 1/1996 | Ellis | |
| 5,483,988 A | 1/1996 | Pringle | |
| 5,488,992 A | 2/1996 | Pringle | |
| 5,500,768 A | 3/1996 | Doggett et al. | |
| 5,503,014 A | 4/1996 | Griffith | |
| 5,503,370 A | 4/1996 | Newman et al. | |
| 5,505,259 A | 4/1996 | Wittrisch et al. | |
| 5,515,926 A | 5/1996 | Boychuk | |
| 5,526,887 A | 6/1996 | Vestavik | |
| 5,561,516 A | 10/1996 | Noble et al. | |
| 5,566,764 A | 10/1996 | Elliston | |
| 5,573,225 A | 11/1996 | Boyle et al. | |
| 5,577,560 A | 11/1996 | Coronado et al. | |
| 5,586,609 A | 12/1996 | Schuh | |
| 5,599,004 A | 2/1997 | Newman et al. | |
| 5,615,052 A | 3/1997 | Doggett | |
| 5,638,904 A | 6/1997 | Misselbrook et al. | |
| 5,655,745 A | 8/1997 | Morrill | |
| 5,694,408 A | 12/1997 | Bott et al. | |
| 5,707,939 A | 1/1998 | Patel | |
| 5,735,502 A | 4/1998 | Levett et al. | |
| 5,757,484 A | 5/1998 | Miles et al. | |
| 5,759,859 A | 6/1998 | Sausa | |
| 5,771,984 A | 6/1998 | Potter et al. | |
| 5,773,791 A | 6/1998 | Kuykendal | |
| 5,794,703 A | 8/1998 | Newman et al. | |
| 5,811,753 A * | 9/1998 | Weick et al. | 219/121.78 |
| 5,813,465 A | 9/1998 | Terrell et al. | |
| 5,828,003 A | 10/1998 | Thomeer et al. | |
| 5,832,006 A | 11/1998 | Rice et al. | |
| 5,833,003 A | 11/1998 | Longbottom et al. | |
| 5,847,825 A | 12/1998 | Alexander | |
| 5,862,273 A | 1/1999 | Pelletier | |
| 5,862,862 A | 1/1999 | Terrell | |
| 5,864,113 A | 1/1999 | Cossi | |

(56) References Cited

U.S. PATENT DOCUMENTS

| | | | |
|---|---|---|---|
| 5,896,482 A | 4/1999 | Blee et al. | |
| 5,896,938 A | 4/1999 | Moeny et al. | |
| 5,902,499 A | 5/1999 | Richerzhagen | |
| 5,909,306 A | 6/1999 | Goldberg et al. | |
| 5,913,337 A | 6/1999 | Williams et al. | |
| 5,924,489 A | 7/1999 | Hatcher | |
| 5,929,986 A | 7/1999 | Slater et al. | |
| 5,933,945 A | 8/1999 | Thomeer et al. | |
| 5,938,954 A | 8/1999 | Onuma et al. | |
| 5,973,783 A | 10/1999 | Goldner et al. | |
| 5,986,236 A | 11/1999 | Gainand et al. | |
| 5,986,756 A | 11/1999 | Slater et al. | |
| RE36,525 E | 1/2000 | Pringle | |
| 6,015,015 A | 1/2000 | Luft et al. | |
| 6,026,112 A * | 2/2000 | Hecht et al. | 372/99 |
| 6,038,363 A | 3/2000 | Slater et al. | |
| 6,059,037 A | 5/2000 | Longbottom et al. | |
| 6,060,662 A | 5/2000 | Rafie et al. | |
| 6,065,540 A | 5/2000 | Thomeer et al. | |
| RE36,723 E | 6/2000 | Moore et al. | |
| 6,076,602 A | 6/2000 | Gano et al. | |
| 6,084,203 A | 7/2000 | Bonigen | |
| 6,092,601 A | 7/2000 | Gano et al. | |
| 6,104,022 A | 8/2000 | Young et al. | |
| RE36,880 E | 9/2000 | Pringle | |
| 6,116,344 A | 9/2000 | Longbottom et al. | |
| 6,135,206 A | 10/2000 | Gano et al. | |
| 6,147,754 A | 11/2000 | Theriault et al. | |
| 6,157,893 A | 12/2000 | Berger et al. | |
| 6,166,546 A | 12/2000 | Scheihing et al. | |
| 6,215,734 B1 | 4/2001 | Moeny et al. | |
| 6,227,300 B1 | 5/2001 | Cunningham et al. | |
| 6,250,391 B1 | 6/2001 | Proudfoot | |
| 6,273,193 B1 | 8/2001 | Hermann et al. | |
| 6,275,645 B1 | 8/2001 | Vereecken et al. | |
| 6,281,489 B1 | 8/2001 | Tubel et al. | |
| 6,301,423 B1 | 10/2001 | Olson | |
| 6,309,195 B1 | 10/2001 | Bottos et al. | |
| 6,321,839 B1 | 11/2001 | Vereecken et al. | |
| 6,352,114 B1 | 3/2002 | Toalson et al. | |
| 6,355,928 B1 | 3/2002 | Skinner et al. | |
| 6,356,683 B1 | 3/2002 | Hu et al. | |
| 6,377,591 B1 | 4/2002 | Hollister et al. | |
| 6,384,738 B1 | 5/2002 | Carstensen et al. | |
| 6,386,300 B1 | 5/2002 | Curlett et al. | |
| 6,401,825 B1 | 6/2002 | Woodrow | |
| 6,426,479 B1 | 7/2002 | Bischof | |
| 6,437,326 B1 | 8/2002 | Yamate et al. | |
| 6,450,257 B1 | 9/2002 | Douglas | |
| 6,494,259 B2 | 12/2002 | Surjaatmadja | |
| 6,497,290 B1 | 12/2002 | Misselbrook et al. | |
| 6,557,249 B1 | 5/2003 | Pruett et al. | |
| 6,561,289 B2 | 5/2003 | Portman et al. | |
| 6,564,046 B1 | 5/2003 | Chateau | |
| 6,591,046 B2 | 7/2003 | Stottlemyer | |
| 6,615,922 B2 | 9/2003 | Deul et al. | |
| 6,626,249 B2 | 9/2003 | Rosa | |
| 6,644,848 B1 | 11/2003 | Clayton et al. | |
| 6,661,815 B1 | 12/2003 | Kozlovsky et al. | |
| 6,710,720 B2 | 3/2004 | Carstensen et al. | |
| 6,712,150 B1 | 3/2004 | Crabtree et al. | |
| 6,725,924 B2 | 4/2004 | Davidson et al. | |
| 6,737,605 B1 | 5/2004 | Kern | |
| 6,747,743 B2 | 6/2004 | Skinner et al. | |
| 6,755,262 B2 | 6/2004 | Parker | |
| 6,808,023 B2 | 10/2004 | Smith et al. | |
| 6,832,654 B2 | 12/2004 | Ravensbergen et al. | |
| 6,847,034 B2 | 1/2005 | Shah et al. | |
| 6,851,488 B2 | 2/2005 | Batarseh | |
| 6,867,858 B2 | 3/2005 | Owen et al. | |
| 6,870,128 B2 | 3/2005 | Kobayashi et al. | |
| 6,874,361 B1 | 4/2005 | Meltz et al. | |
| 6,880,646 B2 | 4/2005 | Batarseh | |
| 6,885,784 B2 | 4/2005 | Bohnert | |
| 6,888,097 B2 | 5/2005 | Batarseh | |
| 6,888,127 B2 | 5/2005 | Jones et al. | |
| 6,912,898 B2 | 7/2005 | Jones et al. | |
| 6,913,079 B2 | 7/2005 | Tubel | |
| 6,920,395 B2 | 7/2005 | Brown | |
| 6,920,946 B2 | 7/2005 | Oglesby | |
| 6,923,273 B2 | 8/2005 | Terry et al. | |
| 6,957,576 B2 | 10/2005 | Skinner et al. | |
| 6,967,322 B2 | 11/2005 | Jones et al. | |
| 6,977,367 B2 | 12/2005 | Tubel et al. | |
| 6,978,832 B2 | 12/2005 | Gardner et al. | |
| 6,981,561 B2 | 1/2006 | Krueger et al. | |
| 6,994,162 B2 | 2/2006 | Robison | |
| 7,040,746 B2 | 5/2006 | McCain et al. | |
| 7,055,604 B2 | 6/2006 | Jee et al. | |
| 7,055,629 B2 | 6/2006 | Oglesby | |
| 7,072,044 B2 | 7/2006 | Kringlebotn et al. | |
| 7,072,588 B2 | 7/2006 | Skinner | |
| 7,086,484 B2 | 8/2006 | Smith, Jr. | |
| 7,087,865 B2 | 8/2006 | Lerner | |
| 7,088,437 B2 | 8/2006 | Blomster et al. | |
| 7,126,332 B2 | 10/2006 | Blanz et al. | |
| 7,134,488 B2 | 11/2006 | Tudor et al. | |
| 7,134,514 B2 | 11/2006 | Riel et al. | |
| 7,140,435 B2 | 11/2006 | Defretin et al. | |
| 7,147,064 B2 | 12/2006 | Batarseh et al. | |
| 7,152,700 B2 | 12/2006 | Church et al. | |
| 7,163,875 B2 | 1/2007 | Richerzhagen | |
| 7,172,026 B2 | 2/2007 | Misselbrook | |
| 7,172,038 B2 | 2/2007 | Terry et al. | |
| 7,174,067 B2 | 2/2007 | Murshid et al. | |
| 7,188,687 B2 | 3/2007 | Rudd et al. | |
| 7,195,731 B2 | 3/2007 | Jones | |
| 7,196,786 B2 | 3/2007 | DiFoggio | |
| 7,199,869 B2 | 4/2007 | MacDougall | |
| 7,201,222 B2 | 4/2007 | Kanady et al. | |
| 7,210,343 B2 | 5/2007 | Shammai et | |
| 7,212,283 B2 | 5/2007 | Hother et | |
| 7,249,633 B2 | 7/2007 | Ravensbergen et al. | |
| 7,264,057 B2 | 9/2007 | Rytlewski et al. | |
| 7,270,195 B2 | 9/2007 | MacGregor et al. | |
| 7,273,108 B2 | 9/2007 | Misselbrook | |
| 7,334,637 B2 | 2/2008 | Smith, Jr. | |
| 7,337,660 B2 | 3/2008 | Ibrahim et al. | |
| 7,362,422 B2 | 4/2008 | DiFoggio et al. | |
| 7,372,230 B2 | 5/2008 | McKay | |
| 7,394,064 B2 | 7/2008 | Marsh | |
| 7,395,696 B2 | 7/2008 | Bissonnette et al. | |
| 7,395,866 B2 | 7/2008 | Milberger et al. | |
| 7,416,032 B2 | 8/2008 | Moeny et al. | |
| 7,416,258 B2 | 8/2008 | Reed et al. | |
| 7,424,190 B2 | 9/2008 | Dowd et al. | |
| 7,471,831 B2 | 12/2008 | Bearman et al. | |
| 7,487,834 B2 | 2/2009 | Reed et al. | |
| 7,490,664 B2 | 2/2009 | Skinner et al. | |
| 7,503,404 B2 | 3/2009 | McDaniel et al. | |
| 7,515,782 B2 | 4/2009 | Zhang et al. | |
| 7,516,802 B2 | 4/2009 | Smith, Jr. | |
| 7,518,722 B2 | 4/2009 | Julian et al. | |
| 7,527,108 B2 | 5/2009 | Moeny | |
| 7,530,406 B2 | 5/2009 | Moeny et al. | |
| 7,559,378 B2 | 7/2009 | Moeny | |
| 7,587,111 B2 | 9/2009 | de Montmorillon et al. | |
| 7,600,564 B2 | 10/2009 | Shampine et al. | |
| 7,603,011 B2 | 10/2009 | Varkey et al. | |
| 7,617,873 B2 | 11/2009 | Lovell et al. | |
| 7,624,743 B2 | 12/2009 | Sarkar et al. | |
| 7,628,227 B2 | 12/2009 | Marsh | |
| 7,646,953 B2 | 1/2010 | Dowd et al. | |
| 7,647,948 B2 | 1/2010 | Quigley et al. | |
| 7,671,983 B2 | 3/2010 | Shammai et al. | |
| 7,715,664 B1 | 5/2010 | Shou et al. | |
| 7,720,323 B2 | 5/2010 | Yamate et al. | |
| 7,769,260 B2 | 8/2010 | Hansen et al. | |
| 7,802,384 B2 | 9/2010 | Kobayashi et al. | |
| 7,834,777 B2 | 11/2010 | Gold | |
| 7,848,368 B2 | 12/2010 | Gapontsev et al. | |
| 7,900,699 B2 | 3/2011 | Ramos et al. | |
| 7,938,175 B2 | 5/2011 | Skinner et al. | |
| 7,944,615 B2 * | 5/2011 | Shklover et al. | 359/629 |

(56) References Cited

U.S. PATENT DOCUMENTS

| | | |
|---|---|---|
| 8,011,454 B2 | 9/2011 | Castillo |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |
| 8,175,433 B2 | 5/2012 | Caldwell et al. |
| 8,322,441 B2 | 12/2012 | Fenton |
| 2002/0007945 A1 | 1/2002 | Neuroth et al. |
| 2002/0020692 A1* | 2/2002 | Smyth .................. 219/121.84 |
| 2002/0039465 A1 | 4/2002 | Skinner |
| 2002/0189806 A1 | 12/2002 | Davidson et al. |
| 2003/0000741 A1 | 1/2003 | Rosa |
| 2003/0053783 A1 | 3/2003 | Shirasaki |
| 2003/0056990 A1 | 3/2003 | Oglesby |
| 2003/0085040 A1 | 5/2003 | Hemphill et al. |
| 2003/0094281 A1 | 5/2003 | Tubel |
| 2003/0132029 A1 | 7/2003 | Parker |
| 2003/0145991 A1 | 8/2003 | Olsen |
| 2003/0159283 A1 | 8/2003 | White |
| 2003/0160164 A1 | 8/2003 | Jones et al. |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammai et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2005/0007583 A1 | 1/2005 | DiFoggio |
| 2005/0012244 A1 | 1/2005 | Jones |
| 2005/0034857 A1 | 2/2005 | Defretin et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121235 A1 | 6/2005 | Larsen et al. |
| 2005/0189146 A1 | 9/2005 | Oglesby |
| 2005/0201652 A1 | 9/2005 | Ellwood, Jr. |
| 2005/0230107 A1 | 10/2005 | McDaniel et al. |
| 2005/0252286 A1 | 11/2005 | Ibrahim et al. |
| 2005/0263281 A1 | 12/2005 | Lovell et al. |
| 2005/0268704 A1 | 12/2005 | Bissonnette et al. |
| 2005/0269132 A1 | 12/2005 | Batarseh et al. |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0282645 A1 | 12/2005 | Bissonnette et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0118303 A1 | 6/2006 | Schultz et al. |
| 2006/0137875 A1 | 6/2006 | Dusterhoft et al. |
| 2006/0185843 A1 | 8/2006 | Smith, Jr. |
| 2006/0191684 A1 | 8/2006 | Smith, Jr. |
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Dale et al. |
| 2007/0081157 A1 | 4/2007 | Csutak et al. |
| 2007/0125163 A1 | 6/2007 | Dria et al. |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0023202 A1 | 1/2008 | Keatch et al. |
| 2008/0053702 A1 | 3/2008 | Smith, Jr. |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2008/0314880 A1* | 12/2008 | Geschwandner et al. ................ 219/121.64 |
| 2009/0020333 A1 | 1/2009 | Marsh |
| 2009/0031870 A1 | 2/2009 | O'Connor |
| 2009/0033176 A1 | 2/2009 | Huang et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler et al. |
| 2010/0044103 A1* | 2/2010 | Moxley et al. ................. 175/16 |
| 2010/0044104 A1 | 2/2010 | Zediker et al. |
| 2010/0044105 A1 | 2/2010 | Faircloth et al. |
| 2010/0044106 A1 | 2/2010 | Zediker et al. |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0155059 A1 | 6/2010 | Ullah |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0215326 A1 | 8/2010 | Zediker et al. |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0326659 A1 | 12/2010 | Schultz et al. |
| 2010/0326665 A1 | 12/2010 | Redlinger et al. |

(56) References Cited

U.S. PATENT DOCUMENTS

| | | |
|---|---|---|
| 2011/0030367 A1 | 2/2011 | Dadd |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler et al. |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt et al. |
| 2012/0068086 A1 | 3/2012 | DeWitt et al. |
| 2012/0068523 A1 | 3/2012 | Bowles |
| 2012/0074110 A1 * | 3/2012 | Zediker ............... B08B 7/0042 219/121.72 |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0217015 A1 | 8/2012 | Zediker et al. |
| 2012/0217017 A1 | 8/2012 | Zediker et al. |
| 2012/0217018 A1 | 8/2012 | Zediker et al. |
| 2012/0217019 A1 | 8/2012 | Zediker et al. |
| 2012/0248078 A1 | 10/2012 | Zediker et al. |
| 2012/0255774 A1 | 10/2012 | Grubb et al. |
| 2012/0255933 A1 | 10/2012 | McKay et al. |
| 2012/0261188 A1 | 10/2012 | Zediker et al. |
| 2012/0266803 A1 | 10/2012 | Zediker et al. |
| 2012/0267168 A1 | 10/2012 | Grubb et al. |
| 2012/1267168 | 10/2012 | Grubb |
| 2012/0273269 A1 | 11/2012 | Rinzler et al. |
| 2012/0273470 A1 | 11/2012 | Zediker et al. |
| 2012/0275159 A1 | 11/2012 | Fraze et al. |
| 2013/0011102 A1 | 1/2013 | Rinzler et al. |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev |
| 2013/0266031 A1 | 10/2013 | Norton |
| 2013/0319984 A1 | 12/2013 | Linyaev |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0 565 287 A1 | 10/1993 |
| EP | 0 950 170 B1 | 9/2002 |
| FR | 2 716 924 A1 | 9/1995 |
| GB | 1 284 454 | 8/1972 |
| GB | 2420358 B | 5/2006 |
| JP | 07-328785 A * | 12/1995 |
| JP | 09-072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2013, Zediker et al.
U.S. Appl. No. 13/403,509, filed Feb. 23, 2012, Fraze et al.
U.S. Appl. No. 13/486,795, filed Jun. 1, 2012, Rinzler et al.
U.S. Appl. No. 13/403,615, filed Feb. 23, 2012, Grubb et al.
U.S. Appl. No. 13/366,882, filed Feb. 6, 2012, McKay et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,132, filed Feb. 23, 2012, Zediker et al.
U.S. Appl. No. 13/403,741, filed Feb. 23, 2012, Zediker et al.
U.S. Appl. No. 13/565,345, filed Feb. 23, 2012, Zediker et al.
U.S. Appl. No. 13/777,650, filed Feb. 26, 2013, Zediker et al.
U.S. Appl. No. 13/782,869, filed Mar. 1, 2013, Linyaev et al.
U.S. Appl. No. 13/782,942, filed Mar. 1, 2013, Norton et al.

(56) References Cited

OTHER PUBLICATIONS

U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
U.S. Appl. No. 13/852,719, filed Mar. 28, 2013, Faircloth et al.
International Search Report and Written Opinion of the International Searching Authority for PCT Application No. PCT/US2010/024368, dated Nov. 2, 2010, 16 pgs.
International Search Report and Written Opinion of the International Searching Authority for PCT Application No. PCT/US2009/054295, dated Apr. 26, 2010, 16 pgs.
International Search Report and Written Opinion of the International Searching Authority for PCT Application No. PCT/US2011/044548, dated Jan. 24, 2012, 17 pgs.
International Search Report and Written Opinion of the International Searching Authority for PCT Application No. PCT/US2011/047902, dated Jan. 17, 2012, 9 pgs.
International Search Report and Written Opinion of the International Searching Authority for PCT Application No. PCT/US2011/050044 dated Feb. 1, 2012, 26 pgs.
International Search Report and Written Opinion of the International Searching Authority for PCT Application No. PCT/US2012/026277, dated May 30, 2012, 11 pgs.
International Search Report and Written Opinion of the International Searching Authority for PCT Application No. PCT/US2012/026265, dated May 30, 2012, 14 pgs.
International Search Report and Written Opinion of the International Searching Authority for PCT Application No. PCT/US2012/026280, dated May 30, 2012, 12 pgs.
International Search Report and Written Opinion of the International Searching Authority for PCT Application No. PCT/US2012/026337, dated Jun. 7, 2012, 21 pgs.
International Search Report and Written Opinion of the International Searching Authority for PCT Application No. PCT/US2012/026471, dated May 30, 2012, 13 pgs.
International Search Report and Written Opinion of the International Searching Authority for PCT Application No. PCT/US2012/026525, dated May 31, 2012, 8 pgs.
International Search Report and Written Opinion of the International Searching Authority for PCT Application No. PCT/US2012/026526, dated May 31, 2012, 10 pgs.
International Search Report and Written Opinion of the International Searching Authority for PCT Application No. PCT/US2012/026494, dated May 31, 2012, 12 pgs.
International Search Report and Written Opinion of the International Searching Authority for PCT Application No. PCT/US2012/020789, dated Jun. 29, 2012, 9 pgs.
International Search Report and Written Opinion of the International Searching Authority for PCT Application No. PCT/US2012/040490, dated Oct. 22, 2012, 14 pgs.
International Search Report and Written Opinion of the International Searching Authority for PCT Application No. PCT/US2012/049338, dated Jan. 22, 2013, 14 pgs.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Akhatov, I. et al., "Collapse and Rebound of a Laser-Induced Cavitation Bubble", *Physics of Fluids*, vol. 13, No. 10, Oct. 2001, pp. 2805-2819.
Albertson, M. L. et al., "Diffusion of Submerged Jets", a paper for the *American Society of Civil Engineers*, Nov. 5, 1852, pp. 1571-1596.

Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.
Aptukov, V. N., "Two Stages of Spallation", publisher unknown, while the date of the publication is unknown, it is believed to be prior to Aug. 19, 2009, 6 pages.
Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Batarseh, S. I. et al, "Innovation in Wellbore Perforation Using High-Power Laser", *International Petroleum Technology Conference*, IPTC N0. 10981, Nov. 2005, 7 pages.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.
Bechtel SAIC Company LLC, "Heat Capacity Analysis", a report prepared for Department of Energy, Nov. 2004, 100 pages.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Benavente, D. et al., "The Combined Influence of Mineralogical, Hygric and Thermal Properties on the Durability of PoroBuilding Stones", *Eur. J. Mineral*, vol. 20, Aug. 2008, pp. 673-685.
Birkholzer, J. T. et al., "The Impact of Fracture-Matrix Interaction on Thermal-Hydrological Conditions in Heated Fractured Rock", an origial research paper published online http://vzy.scijournals.org/cgi/content/full/5/2/657, May 26, 2006, 27 pages.
Blackwell, D. D. et al., "Geothermal Resources in Sedimentary Basins", a presentation for the Geothermal Energy Generation in Oil and Gas Settings, Mar. 13, 2006, 28 pages.
Blomqvist, M. et al., "All-in-Quartz Optics for Low Focal Shifts", *SPIE Photonics West Conference in San Francisco*, Jan. 2011, 12 pages.
Boechat, A. A. P. et al., "Bend Loss in Large Core Multimode Optical Fiber Beam Delivery Systems", *Applied Optics.*, vol. 30 No. 3, Jan. 20, 1991, pp. 321-327.
Bolme, C. A., "Ultrafast Dynamic Ellipsometry of Laser Driven Shock Waves", a dissertation for the degree of Doctor of Philosophy in Physical Chemistry at Massachusetts Institute of Technology, Sep 2008, pp. 1-229.
Burdine, N. T., "Rock Failure Under Dynamic Loading Conditions", Society of Petroleum Engineers Journal, Mar. 1963, pp. 1-8.
Bybee, K., "Modeling Laser-Spallation Rock Drilling", *JPT*, an SPE available at www.spe.org/jpt, Feb. 2006, 2 pp. 62-63.
Bybee, Karen, highlight of "Drilling a Hole in Granite Submerged in Water by Use of CO2 Laser", an SPE available at www.spe.org/jpt, *JPT*, Feb. 2010, pp. 48, 50 and 51.
Capetta, I. S. et al., "Fatigue Damage Evaluation on Mechanical Components Under Multiaxial Loadings", European Comsol Conference, University of Ferrara, Oct. 16, 2009, 25 pages.
Chastain, T. et al., "Deepwater Drilling Riser System", *SPE Drilling Engineering*, Aug. 1986, pp. 325-328.
Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.
Chen, K., paper titled "Analysis of Oil Film Interferometry Implementation in Non-Ideal Conditions", source unknown, Jan. 7, 2010, pp. 1-18.
Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.

(56) References Cited

OTHER PUBLICATIONS

Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Cohen, J. H., "High-Power Slim-Hole Drilling System", a paper presented at the conference entitled Natural Gas RD&D Contractors Review Meeting, Office of Scientific and Technical Information, Apr. 1995, 10 pages.

Cone, C., "Case History of the University Block 9 (Wolfcamp) Field—Gas-Water Injection Secondary Recovery Project", *Journal of Petroleum Technology*, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.

Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.

Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.

Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Finger, J. T. et al., "PDC Bit Research at Sandia National Laboratories", Sandia Report No. SAND89-0079-UC-253, a report prepared for Department of Energy, Jun. 1989, 88 pages.

Freeman, T. T. et al., "THM Modeling for Reservoir Geomechanical Applications", presented at the COMSOL Conference, Oct. 2008, 22 pages.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gale, J. F. W. et al., "Natural Fractures in the Barnett Shale and Their Importance for Hydraulic Fracture Treatments", The American Assoction of Petroleum Geologists, *AAPG Bulletin*, vol. 91, No. 4, Apr. 2007, pp. 603-622.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Grigoryan, V., "InhomogeneoBoundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hammer, D. X. et al., "Shielding Properties of Laser-Induced Breakdown in Water for Pulse Durations from 5 ns to 125 fs", *Applied Optics*, vol. 36, No. 22, Aug. 1, 1997, pp. 5630-5640.

Han, Wei, "Computational and experimental investigations of laser drilling and welding for microelectronic packaging", *Dorchester Polytechnic Institute*, A Dissertation submitted in May 2004, 242 pgs.

Hareland, G. et al., "Drag-Bit Model Including Wear", *SPE*, No. 26957, a paper prepared for presentation at the Latin American/Caribbean Petroleum Engineering Conference, Apr. 1994, pp. 657-667.

Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

(56) References Cited

OTHER PUBLICATIONS

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Huang, H. et al., "Intrinsic Length Scales in Tool-Rock Interaction", *International Journal of Geomechanics*, Jan./Feb. 2008, pp. 39-44.

Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.

Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.

Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.

Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.

Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.

Karakas, M., "Semianalytical Productivity Models for Perforated Completions", *SPE*, No. 18247, a paper for SPE (Society of Petroleum Engineers) Production Engineering, Feb. 1991, pp. 73-82.

Khandelwal, M., "Prediction of Thermal Conductivity of Rocks by Soft Computing", *Int. J. Earth Sci. (Geol. Rundsch)*, May 11, 2010, 7 pages.

Kobyakov, A. et al., "Design Concept for Optical Fibers with Enhanced SBS Threshold", *Optics Express*, vol. 13, No. 14, Jul. 11, 2005, pp. 5338-5346.

Kolle, J. J., "HydroPulse Drilling", a Final Report for Department of Energy under Cooperative Development Agreement No. DE-FC26-FT34367, Apr. 2004, 28 pages.

Kovalev, V. I. et al., "Observation of Hole Burning in Spectrum in SBS in Optical Fibres Under CW Monochromatic Laser Excitation", *IEEE*, Jun 3, 2010, pp. 56-57.

Koyamada, Y. et al., "Simulating and Designing Brillouin Gain Spectrum in Single-Mode Fibers", *Journal of Lightwave Technology*, vol. 22, No. 2, Feb. 2004, pp. 631-639.

Langeveld, C. J., "PDC Bit Dynamics", a paper prepared for presentation at the 1992 IADC/SPE Drilling Conference, Feb. 1992, pp. 227-241.

Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.

Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Liddle, D. et al., "Cross Sector Decommissioning Workshop", presentation, Mar. 23, 2011, 14 pages.

Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.

Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.

Luffel, D. L. et al., "Travis Peak Core Permeability and Porosity Relationships at Reservoir Stress", *SPE Formation Evaluation*, Sep. 1991, pp. 310-318.

Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.

Manrique, E. J. et al., "EOR Field Experiences in Carbonate Reservoirs in the United States", *SPE Reservoir Evaluation & Engineering*, Dec. 2007, pp. 667-686.

Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.

Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.

McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.

Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.

Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.

Messica, A. et al., "Theory of Fiber-Optic Evanescent-Wave Spectroscopy and Sensor", *Applied Optics*, vol. 35, No. 13, May 1, 1996, pp. 2274-2284.

Mills, W. R. et al., "Pulsed Neutron Porosity Logging", SPWLA Twenty-Ninth Annual Logging Symposium, Jun. 1988, pp. 1-21.

Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.

Moavenzadeh, F. et al., "Thin Disk Technique for Analyzing Fock Fractures Induced by Laser Irradiation", a report prepared for the Department of Transportation under Contract C-85-65, May 1968, 91 pages.

Mocofanescu, A. et al., "SBS threshold for single mode and multimode GRIN fibers in an all fiber configuration", *Optics Express*, vol. 13, No. 6, 2005, pp. 2019-2024.

Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.

Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.

Nikles, M. et al., "Brillouin Gain Spectrum Characterization in Single-Mode Optical Fibers", *Journal of Lightwave Technology*, vol. 15, No. 10, Oct. 1997, pp. 1842-1851.

Nolen-Hoeksema, R., "Fracture Development and Mechnical Stratigraphy of Austin Chalk, Texas: Discussion", a discussion for the American Association of Petroleum Geologists Bulletin, vol. 73, No. 6, Jun. 1989, pp. 792-793.

Oglesby, K. et al., "Advanced Ultra High Speed Motor for Drilling", a project update by Impact Technologies LLC for the Department of Energy, Sep. 12, 2005, 36 pages.

Ouyang, L. B. et al., "General Single Phase Wellbore Flow Model", a report prepared for the COE/PETC, May 2, 1997, 51 pages.

Palchaev, D. K. et al., "Thermal Expansion of Silicon Carbide Materials", *Journal of Engineering Physics and Thermophysics*, vol. 66, No. 6, 1994, 3 pages.

Parker, R. et al., "Drilling Large Diameter Holes in Rocks Using Multiple Laser Beams (504)", while the date of the publication is unknown, it is believed to be prior to Aug. 19, 2009, 6 pages.

Patricio, M. et al., "Crack Propagation Analysis", while the date of the publication is unknown, it is believed to be prior to Aug. 19, 2009, 24 pages.

(56) References Cited

OTHER PUBLICATIONS

Pepper, D. W. et al., "Benchmarking COMSOL Multiphysics 3.5a—CFD Problems", a presentation, Oct. 10, 2009, 54 pages.
Pettitt, R. et al., "Evolution of a Hybrid Roller Cone/PDC Core Bit", a paper prepared for Geothermal Resources Council 1980 Annual Meeting, Sep. 1980, 7 pages.
Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.
Pooniwala, S. et al., "Lasers: the Next Bit", a paper prepared for the presentation at the 2006 SPE (Society of Petroleum Engineers) Eastern Regional Meeting, Oct. 2006, pp. 1-10.
Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.
Powell, M. et al., "Optimization of UHP Waterjet Cutting Head, The Orifice", Flow International, while the date of the publication is unknown, it is believed to be prior to Aug. 19, 2009, 19 pages.
Price, R. H. et al., "Analysis of the Elastic and Strength Properties of Yuccs Mountain tuff, Nevada", 26th Symposium on Rock Mechanics, Jun. 1985, pp. 89-96.
Quinn, R. D. et al., "A Method for Calculating Transient Surface Temperatures and Surface Heating Rates for High-Speed Aircraft", NASA, Dec. 2000, 35 pages.
Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.
Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.
Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.
Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.
Ravishankar, M. K., "Some Results on Search Complexity vs Accuracy", DARPA Spoken Systems Technology Workshop, Feb. 1997, 4 pages.
Ream, S. et al., "Zinc Sulfide Optics for High Power Laser Applications", Paper 1609, while the date of the publication is unknown, it is believed to be prior to Aug. 19, 2009, 7 pages.
Rice, J. R., "On the Stability of Dilatant Hardening for Saturated Rock Masses", *Journal of Geophysical Research*, vol. 80, No. 11, Apr. 10, 1975, pp. 1531-1536.
Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.
Rosler, M., "Generalized Hermite Polynomials and the Heat Equation for Dunkl Operators", a paper, while the date of the publication is unknown, it is believed to be prior to Aug. 19, 2009, pp. 1-24.
Rubin, A. M. et al., "Dynamic Tensile-Failure-Induced Velocity Deficits in Rock", *Geophysical Research Letters*, vol. 18, No. 2, Feb. 1991, pp. 219-222.
Salehi, I. A. et al., "Laser Drilling—Drilling with the Power Light", a final report a contract with DOE with award No. DE-FC26-00NT40917, May 2007, in parts 1-4 totaling 318 pages.
Santarelli, F. J. et al., "Formation Evaluation From Logging on Cuttings", *SPE Reservoir Evaluation & Engineering*, Jun. 1998, pp. 238-244.
Sattler, A. R., "Core Analysis in a Low Permeability Sandstone Reservoir: Results from the Multiwell Experiment", a report by Sandia National Laboratories for The Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.
Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.
Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.
Scholz, C. H., "Microfracturing of Rock in Compression", a dissertation for the degree of Doctor of Philosophy at Massachusettes Instutute of Trechnology, Sep. 1967, 177 pages.
Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.
Shiraki, K. et al., "SBS Threshold of a Fiber with a Brillouin Frequency Shift Distribution", *Journal of Lightwave Technology*, vol. 14, No. 1, Jan. 1996, pp. 50-57.
Sinha, D., "Cantilever Drilling—Ushering a New Genre of Drilling", a paper prepared for presentation at the SPE/IADC Middle East Drilling Technology Conference and Exhibition, Oct. 2003, 6 pages.
Sinor, A. et al., "Drag Bit Wear Model", *SPE Drilling Engineering*, Jun. 1989, pp. 128-136.
Sneider, RM et al., "Rock Types, Depositional History, and Diangenetic Effects, Ivishak reservoir Prudhoe Bay Field", *SPE Reservoir Engineering*, Feb. 1997, pp. 23-30.
Soeder, D. J. et al., "Pore Geometry in High- and Low-Permeability Sandstones, Travis Peak Formation, East Texas", *SPE Formation Evaluation*, Dec. 1990, pp. 421-430.
Somerton, W. H. et al., "Thermal Expansion of Fluid Saturated Rocks Under Stress", SPWLA Twenty-Second Annual Logging Symposium, Jun. 1981, pp. 1-8.
Straka, W. A. et al., "Cavitation Inception in Quiescent and Co-Flow Nozzle Jets", 9th International Conference on Hydrodynamics, Oct. 2010, pp. 813-819.
Suarez, M. C. et al., "COMSOL in a New Tensorial Formulation of Non-Isothermal Poroelasticity", publisher unknown, while the date of the publication is unknown, it is believed to be prior to Aug. 19, 2009, 2 pages.
Summers, D. A., "Water Jet Cutting Related to Jet & Rock Properties", publisher unknown, while the date of the publication is unknown, it is believed to be prior to Aug. 19, 2009, 13 pages.
Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.
Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastracture Development in the Northern Regions, Jun. 2005, 7 pages.
Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.
Terzopoulos, D. et al., "Modeling Inelastic Deformation: Viscoelasticity, Plasticity, Fracture", *SIGGRAPH '88*, Aug. 1988, pp. 269-278.
Thompson, G. D., "Effects of Formation Compressive Strength on Perforator Performance", a paper presented of the Southern District API Division of Production, Mar. 1962, pp. 191-197.
Tuler, F. R. et al., "A Criterion for the Time Dependence of Dynamic Fracture", *The International Jopurnal of Fracture Mechanics*, vol. 4, No. 4, Dec. 1968, pp. 431-437.
Turner, D. et al., "New Dc Motor for Downhole Drilling and Pumping Applications", a paper prepared for presentation at the SPE/ICoTA Coiled Tubing Roundtable, Mar. 2001, pp. 1-7.

(56) References Cited

OTHER PUBLICATIONS

Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.

Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.

Udd, E. et al., "Fiber Optic Distributed Sensing Systems for Harsh Aerospace Environments", publisher unknown, while the date of the publication is unknown, it is believed to be prior to Aug. 19, 2009, 12 pages.

Valsangkar, A. J. et al., Stress-Strain Relationship for Empirical Equations of Creep in Rocks, *Engineering Geology*, Mar. 29, 1971, 5 pages.

Wagner, F. et al., "The Laser Microjet Technology—10 Years of Development (M401)", publisher unknown, while the date of the publication is unknown, it is believed to be prior to Aug. 19, 2009, 9 pages.

Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.

Wandera, C. et al., "Characterization of the Melt Removal Rate in Laser Cutting of Thick-Section Stainless Steel", *Journal of Laser Applications*, vol. 22, No. 2, May 2010, pp. 62-70.

Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.

Warren, T. M. et al., "Laboratory Drilling Performance of PDC Bits", *SPE Drilling Engineering*, Jun. 1988, pp. 125-135.

Wen-gui, Cao et al., "Damage constituitive model for strain-softening rock based on normal distribution and its parameter determination", *J. Cent. South Univ. Technol.*, vol. 14, No. 5, 2007, pp. 719-724.

White, E. J. et al., "Reservoir Rock Characteristics of the Madison Limestone in the Williston Basin", *The Log Analyst*, Sep.-Oct. 1970, pp. 17-25.

White, E. J. et al., "Rock Matrix Properties of the Ratcliffe Interval (Madison Limestone) Flat Lake Field, Montana", *SPE of AIME*, Jun. 1968, 16 pages.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of The Industrial Physicist at: http://www.aip.org/tip/INPHFA/vol-9/iss-3/p24.html, on May 18, 2010, pp. 1-5.

Xu, Z. et al., "Application of High Powered Lasers to Perforated Completions", *International Congress on Applications of Laser & Electro-Optics*, Oct. 2003, 6 pages.

Xu, Z. et al., "Laser Rock Drilling by A Super-Pulsed CO2 Laser Beam", a manuscript created for the Department of Energy, while the date of the publication is unknown, it is believed to be prior to Aug. 19, 2009, 9 pages.

Xu, Z. et al., "Specific Energy of Pulsed Laser Rock Drilling", *Journal of Laser Applications*, vol. 15, No. 1, Feb. 2003, pp. 25-30.

Yamashita, Y. et al., "Underwater Laser Welding by 4kW CW YAG Laser", *Journal of Nuclear Science and Technology*, vol. 38, No. 10, Oct. 2001, pp. 891-895.

York, J. L. et al., "The Influence of Flashing and Cavitation on Spray Formation", a progress report for UMRI Project 2815 with Delavan Manufacturing Company, Oct. 1959, 27 pages.

Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.

Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): *Rock Mechanics Across Borders and Disciplines*, Jun. 2004, 9 pages.

Zeuch, D.H. et al., "Rock Breakage Mechanism Wirt A PDC Cutter", *Society of Petroleum Engineers, $60^{th}$ Annual Technical Conference*, Las Vegas, Sep. 22-25, 1985, 11 pgs.

Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.

Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.

Zietz, J. et al., "Determinants of House Prices: A Quantile Regression Approach", *Department of Economics and Finance Working Paper Series*, May 2007, 27 pages.

"Chapter I—Laser-Assisted Rock-Cutting Tests", publisher unknown, while the date of the publication is unknown, it is believed to be prior to Aug. 19, 2009, 64 pages.

"Chapter 7: Energy Conversion Systems—Options and Issues", publisher unknown, while the date of the publication is unknown, it is believed to be prior to Aug. 19, 2009, pp. 7-1 to 7-32 and table of contents page.

"Cross Process Innovations", Obtained from the Internet at: http://www.mrl.columbia.edu/ntm/CrossProcess/CrossProcessSect5.htm, on Feb. 2, 2010, 11 pages.

"Fourier Series, Generalized Functions, Laplace Transform", publisher unknown, while the date of the publication is unknown, it is believed to be prior to Aug. 19, 2009, 6 pages.

"Introduction to Optical Liquids", published by Cargille-Sacher Laboratories Inc., Obtained from the Internet at: http://www.cargille.com/opticalintro.shtml, on Dec. 23, 2008, 5 pages.

"Laser Drilling", Oil & Natural Gas Projects (Exploration & Production Technologies) Technical Paper, Dept. of Energy, Jul. 2007, 3 pages.

"Leaders in Industry Luncheon", IPAA & TIPRO, Jul. 8, 2009, 19 pages.

"Measurement and Control of Abrasive Water-Jet Velocity", publisher unknown, while the date of the publication is unknown, it is believed to be prior to Aug. 19, 2009, 8 pages.

"Performance Indicators for Geothermal Power Plants", prepared by International Geothermal Association for World Energy Council Working Group on Performance of Renewable Energy Plants, author unknown, Mar. 2011, 7 pages.

"Rock Mechanics and Rock Engineering", publisher unknown, while the date of the publication is unknown, it is believed to be prior to Aug. 19, 2009, 69 pages.

"Silicone Fluids: Stable, Inert Media", Gelest, Inc., while the date of the publication is unknown, it is believed to be prior to Aug. 19, 2009, 27 pages.

"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.

"Underwater Laser Cutting", TWI Ltd, May/Jun. 2011, 2 pages.

Utility U.S. Appl. No. 13/777,650, filed Feb. 26, 2013, 73 pages.

Utility U.S. Appl. No. 13/782,869, filed Mar. 1, 2013, 80 pages.

Utility U.S. Appl. No. 13/782,942, filed Mar. 1, 2013, 81 pages.

(56) References Cited

OTHER PUBLICATIONS

Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.
Utility U.S. Appl. No. 13/852,719, filed Mar. 28, 2013, 85 pages.
Daneshy, A., Jr. "Opening of a Pressurized Fracture in an Elastic Medium," Petroleum Society of CIM, Paper No. 7616, Jun. 1971, 17 pp.
Daneshy, A., "A Study of Inclined Hydraulic Fractures," Society of Petroleum Engineers Journal, SPE 4062, Apr. 1973, 8 pp.
Daneshy, A., "Experimental Investigation of Hydraulic Fracturing Through Perforations," Journal of Petroleum Technology, SPE 4333, Oct. 1973, 6 pp.
Van De Ketterij, R.G., "Impact of Perforations on Hydraulic Fracture to Tortuosity," SPE Prod. & Facilities, 14 (2), May 1999, 8 pages.
Pearson, C.M., "Results of Stress-Oriented and Aligned Perforating in Fracturing Deviated Wells," JPT, Jan. 1992. 9 pp.
Warpinski, Norman R., "Laboratory Investigation on the Effect of In-Situ Stressed on Hydraulic Fracture Containment," Society of Petroleum Engineers of AIME, Jun. 1982. 8 pp.
Teufel, Lawrence, W., "Hydraulic Fracture Propagation in Layered Rock: Experimental Studies of Fracture Containment," Society of Petroleum Engineers of AIME, Feb. 1984, 14 pages.
Warpinski, N.R., "Influence of Geologic Discontinuities on Hydraulic Fracture Propagation," Journal of Petroleum Technology, Feb. 1987, 14 pages.

\* cited by examiner

TOTAL INTERNAL REFLECTION LASER TOOLS AND METHODS

This application claims, under 35 U.S.C. §119(e)(1) the benefit of the filing date of Mar. 1, 2012 of U.S. provisional application Ser. No. 61/605,434 filed Mar. 1, 2012 and the benefit of the filing date of Jan. 23, 2013 of U.S. provisional application Ser. No. 61/755,745, the entire contents of each of the above mentioned provisional applications is incorporated herein by reference.

This invention was made with Government support under Award DE-AR0000044 awarded by the Office of ARPA-E U.S. Department of Energy. The Government has certain rights in this invention.

BACKGROUND OF THE INVENTION

Field of the Invention

The present inventions relate to methods, apparatus and systems for the delivery of high power laser beams to a work surface, and in particular, a work surface that may on a factory floor, may be in remote, hazardous, optically occluded and difficult to access locations, such as: oil wells, boreholes in the earth, pipelines, underground mines, natural gas wells, geothermal wells, surface mines, subsea, nuclear reactors, or in other environments.

SUMMARY

There is a need to perform operations such as cutting, removing, milling, drilling, perforating and cleaning in many settings, including on the factory floor and in the exploration, production, and development of natural resources, such as minerals, ores, gems, oil, gas and geothermal. The present inventions, among other things, meet these needs by providing the articles of manufacture, devices and processes taught herein.

Thus, there is provided a TIR high power laser tool having: a beam tube, and the beam tube having a laser beam path for transmitting a laser beam within the beam tube and for delivering a fluid; a housing in fluid communication with the beam tube, and the housing having a TIR polyhedron structure made from a material that is transmissive to the laser beam; and, a passage defined in part by a TIR surface of the TIR polyhedron structure, and having the passage in fluid communication with the beam tube and having the passage removed from the laser beam path; and the laser beam path extending through a first surface of the TIR polyhedron structure and into the material; the laser beam path extending to and from the TIR surface and forming an angle of incidence $\theta_i$ on the TIR surface that is greater than a critical angle $\theta_c$ for the TIR surface, whereby the laser beam traveling along the laser beam path is reflected within the TIR structure by total internal reflection from the TIR surface.

Further there is provided TIR high power laser tools having one or more of the following features: wherein the fluid has an index of refraction of $n_2$ and the material has an index of refraction of $n_1$, and wherein $n_1$ is greater than $n_2$; wherein the beam tube defines a beam tube passage and wherein the fluid and laser beam path are within the beam tube passage, whereby the laser beam is transmitted through the fluid in the beam tube passage; wherein the housing comprises a nozzle and the laser beam path from the TIR surface extends through the nozzle; wherein the TIR structure has a 1-degree tilt and the nozzle has a 2-degree tilt; and, wherein the TIR structure is a right angle prism having a hypotenuse that includes the TIR surface; wherein the TIR structure is a right angle prism having a hypotenuse and the TIR surface is the hypotenuse.

Moreover, there is provided a TIR high power laser head for use with a high power laser tool, the laser head having: a TIR structure having a first face, a second face and a third face and having an index of refraction $n_1$ for a laser beam having predetermined beam parameters; a laser beam path along which the laser beam travels, the laser beam path extending through the first face, to the second face and through the third face; and, the second face having a TIR surface.

Still further there is provided a TIR high power laser head having one or more of the following features: wherein the laser beam has a wavelength of from about 400 nm to about 1,600 nm and a power of at least about 10 kW; wherein the laser beam has a spot size on the first face of the TIR structure of less than about 4 cm$^2$; wherein the laser beam has a spot size on the first face of the TIR structure of less than about 2 cm$^2$; wherein the laser beam has a power of at least about 20 kW and wherein the laser beam has a spot size on the first face of the TIR structure of at least about 0.08 cm$^2$; wherein the laser beam has a power of at least about 20 kW and the spot size on the first face of the TIR structure is from about 0.5 cm$^2$ to about 0.08 cm$^2$; wherein the TIR structure is a right angle prism having a hypotenuse and the TIR surface is at least a portion of the hypotenuse; having a mount, the mount having a top window and a side window; a first wall and a second wall defining a channel; the channel containing a material having an index of refraction of $n_2$ for the laser beam; the material in optical contact with the TIR surface, wherein in $n_1$ is greater than $n_2$; wherein the material having the index of refraction $n_2$ is a fluid; wherein this material is a gas; wherein this material is air; having a prism mount, the prism mount comprising a top window and a side window; a first channel wall and a second channel wall defining a channel; wherein the second channel wall comprises the second face; the channel containing a material having an index of refraction of $n_2$ for the laser beam; the material in optical contact with the TIR surface; wherein $n_1$ is greater than $n_2$ and the $n_2$ material is a gas; and, wherein the TIR surface has a critical angle $\theta_c$ and the laser beam path forms an angle of incidence $\theta_i$ with the TIR surface; and wherein $\theta_i$ is greater than $\theta_c$.

Additionally, there is provided a method of directing a high power laser beam within a laser tool, the method including: directing a laser beam along a beam path to a first surface of a TIR structure in a laser tool; the laser beam traveling along the laser beam path entering the TIR structure through the first surface and traveling along the laser beam path within the TIR structure to a second surface of the TIR structure; the laser beam being reflected by total internal reflection from the second surface and traveling along the laser beam path within the TIR structure to a third surface of the TIR structure; and, directing the laser beam along the laser beam path from the laser tool.

Still additionally, the TIR methods of directing a laser beam within a high power laser tool may have one or more or the following features: wherein the TIR structure has an index of refraction for the laser beam of $n_1$; and providing a fluid having an index of refraction of $n_2$ adjacent to the second surface of the TIR structure, wherein $n_1$ is greater than $n_2$; wherein the laser beam is transmitted through this fluid as the laser beam is directed from the laser tool; wherein the laser beam is transmitted through this fluid as the laser beam is delivered to the TIR structure.

DESCRIPTION OF THE PREFERRED EMBODIMENTS

Figure 1:
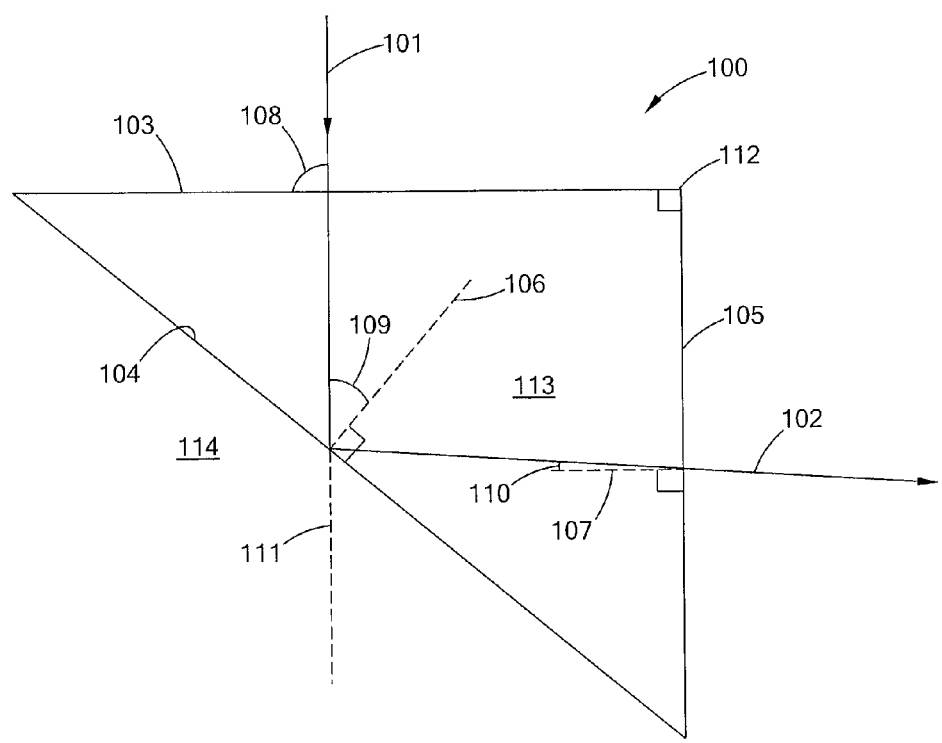
FIG. 1 is a schematic cross sectional view of an embodiment of a TIR structure in accordance with the present invention.

In general, the present inventions relate to high power laser tools that may be used with, as a part of, or in conjunction with, systems, methods and tools for applying laser energy for performing laser applications and laser assisted applications such as cutting, heat treating, thermal processing, annealing, cladding, hard facing, welding, removing material, monitoring, cleaning, controlling, assembling, drilling, machining, powering equipment, milling, flow assurance, decommissioning, plugging, abandonment and perforating.

Generally, a total internal reflectance ("TIR") prism directs a laser beam along a portion of a laser beam path within, into, and out of a laser tool. High power laser tools with a TIR prism may direct the high power laser beam to a work surface for performing a laser or laser assisted operation.

The TIR prism is configured such that a high power laser beam, i.e., 1 kW or greater, is directed toward a first face or surface of the prism, which can be referred to as the incoming, or receiving, face. Preferably, this face has an antireflective coating. The plane of first face is essentially normal, i.e., about 90 degrees, to the laser beam path and the laser beam traveling along that path. This angle, which can be referred to as the incoming beam path-face angle, may vary from 90 degrees, preferably by no more than about 5 degrees. Larger and smaller angles of variation are contemplated, but less preferred. Custom and more specialized antireflective coatings and other means to address reflections may be needed when the incoming beam path-face angle is greater or less than about 85-95 degrees.

Upon entering the prism the laser beam travels along the laser beam path through the prism material and strikes a second surface or face within the prism, e.g., the hypotenuse, of the prism. The material on the outside of this second face has an index of refraction, which in view of the angle at which the laser beam is striking the second face, results in the total internal reflection of the laser beam within the prism. Total internal reflection occurs when the index of refraction $n_1$ of the prism material is greater than the index of refraction $n_2$ of the material adjacent the second prism face. Further, for total internal reflection to occur the angle at which the laser beam path and laser beam strike the second prism face (the angle of incidence, $\theta_i$) must be greater than the critical angle $\theta_c$ as measured from the surface normal. The critical angle $\theta_c$ is defined by the equation $$\theta c = \sin^{-1}\left(\frac{n_2}{n_1}\right).$$

Thus, the laser beam is reflected from the second face of the prism by total internal reflection and then travels along the laser beam path from the second face to the third face of the prism. The angle at which the laser beam path and laser beam strike the third prism face is smaller than the critical angle, and thus, the laser beam traveling along the laser beam path leaves the prism, e.g., is launched from the third face along the laser beam path. Upon leaving the third face the laser beam continues to travel along the laser beam path toward, e.g., other optics, another TIR prism, a nozzle, a fluid jet, a work surface, and combinations and various of these and other intermediate and end points along the laser beam path.

Thus, by way of illustration, turning to FIG. 1 there is shown a schematic diagram of an embodiment of a TIR prism in a laser tool. The TIR prism 100 has material 113 having an index of refraction $n_1$; and has a first, incoming, face or surface 103, a second, TIR, face or surface 104, and a third, exit, face or surface 105. The prism would be a 90-degree prism, as surfaces 103 and 105 meet at a right (90 degree) angle at point 112. A material 114, is adjacent surface 104 and has an index of refraction $n_2$ that is different from the index of refraction $n_1$ of the prism material 113. Index of refraction $n_1$ is greater than index of refraction $n_2$. It further being understood that index of refraction for a particular material is wavelength dependent.

A laser beam traveling along incoming beam path 101 enters the prism passing through surface 103. The angle 108 (incoming beam path-face angle) between beam path 101 and surface 103 is 89 degrees. The incoming beam path 101 is coaxial with the longitudinal axis 111 of the laser tool. The laser beam traveling along the laser beam path within the prism 100 strikes surface 104. The beam and beam path form an angle 109 (the angle of incidence $\theta_i$) with surface 104. Angle 109 is measured from a line (dashed line 106), that is normal (90 degrees) to surface 104. In this embodiment angle 109, $\theta_i$, is 46 degrees. $\theta_i$ is greater than the critical angle, $\theta_c$, and surface 104 provides total internal reflection directing the laser beam along beam path 102 toward and through surface 105.

Thus, in a TIR prism, it is an internal surface of the prism that the laser beam is reflected from. This is to be contrasted with a convention mirror, in which it is an external surface that the laser beam is reflected from. Especially in harsh environments and as laser powers increase, having an internal reflective surface provides advantages over an external reflective surface, by keeping that surface clean and protected, e.g., from dirt, debris and environmental factors.

Returning to FIG. 1, after being reflected from TIR surface 104, the laser beam traveling along path 102 strikes the surface 105 at an angle 110, which is measured from a line (dashed line 107) that is normal (90 degrees) to the surface 105. Angle 110 is smaller than the critical angle for surface 105, and thus the laser beam is transmitted through surface 105. In this embodiment angle 110 is 2 degrees.

Thus, in the embodiment of FIG. 1 the prism has a 1 degree tilt from the tool axis 111 and incoming beam path 101, and provides a 2 degree tilt from horizontal (i.e., normal to the tool and beam axis) for the exiting laser beam 102 and beam path. Depending upon the position of the prism relative to the incoming laser beam and other factors, the angle of the exiting laser beam from the prism relative to the incoming laser beam into the prism may be 90 degrees, about 90 degrees, and greater than or less than 90 degrees, e.g., about 89 degrees, about 91 degrees, about 92 degrees, about 88 degrees, about 93 degrees, and about 87 degrees.

Although a prism is the preferred geometric shape for use as the TIR structure, that structure may be any polyhedron, as long as the geometry, in conjunction with other factors, provides for total internal reflection on the intended TIR surfaces. The TIR structure, e.g., the prism, may be made of fused silica, sapphire, diamond, calcium chloride, or other such materials capable of handling high power laser beams and transmitting them with little, low or essentially no absorbance of the laser beam. The entrance and exit faces of the TIR structure should have AR (anti-reflective) coatings matched to the medium of transmission. Typically, AR coatings have a much lower absorption than HR (highly-reflective) coatings, which would be used on conventional reflective mirrors, and as a consequence AR coatings cause substantially less heating in the substrate than would be present if HR coatings were used. Thus, an advantage in using TIR structures is the reduce need and reduce usage of HR coatings, and preferably the elimination of the need for such coatings along the high power laser beam path in the tool. The material adjacent the TIR structure's TIR surface can be any material having, or in operation of the tool providing, an index of refraction $n_2$ that is lower than the index of refraction $n_1$ of the material of the TIR structure at the TIR surface. Thus, this material may be a fluid (e.g., liquid or gas), a supercritical fluid, or a solid. For example, this material could be an oil, mineral oil, silicon oil, diesel, water, deuterium oxide, air, nitrogen or oxygen. Multiple TIR surfaces and reflections can be used in a single TIR structure to make a total desired beam angle change with virtually no loss, essentially no loss, in power at each TIR surface or interface.

The faces of the TIR structure, such as the first and third non-TIR faces of a TIR prism, may also have beam shaping, affecting or changing optics incorporated into them, and thus, may function as, for example, a lens.

The area, e.g., spot size, of the laser beam striking the first surface of the TIR structure may be selected or is dependent upon factors such as the power/area that this surface can handle without being damage or otherwise adversely affected, the optics of the tool, the relative position of the optics with respect to the TIR structure, the intended spot size of the laser beam at the work surface, the physical size limitation on the tool, and other factors. Thus, for example, the spot size on the first face of the TIR structure may be less than about 4 $cm^2$, less than about 2 $cm^2$, at least about 0.08 $cm^2$ for laser beams having at least about 20 kW of power, and from about 0.5 $cm^2$ to about 0.08 $cm^2$.

There may be one, two, three or more TIR structures, each having one, two, three or more TIR surfaces, in a tool, or combination of tools. The tool may have one, two, three or more laser beams and laser beam paths. The laser beam path may be co-axial with an axis of the tool, may be parallel but not co-axial with an axis of the tool, and may be non-parallel with an axis of the tool. The tool may also have other components, such as controllers, optics, optical assemblies, optical connectors, locking and latching devices, connectors, motors, sensors, fluid jets, optical fibers, umbilicals, control, data and monitoring cables, and mechanical removal elements.

In an embodiment of the TIR laser tool the prism is preferably made from fused silica and the material on the face of the second surface, the hypotenuse, is air. In operation, the air is flowing and flowing in a manner that removes any heat that may build up within or on the prism. Although air and fused silica are use in this embodiment other materials and fluids may be utilized including liquids; provided that the differing indices of refraction and angle of laser beam incidence on the internal prism face result in total internal reflection. Typically sapphire has a high absorption at 1070 nm and in that wavelength and wavelength range fused silica is preferred. Wavelengths and wavelength ranges may vary for applications and systems.

EXAMPLES

The following examples are provide to illustrate various configurations of embodiments of TIR high power laser tools. These examples are for illustrative purposes, and should not be view as, and do not otherwise limit the scope of the present inventions.

Example 1

Figure 2:
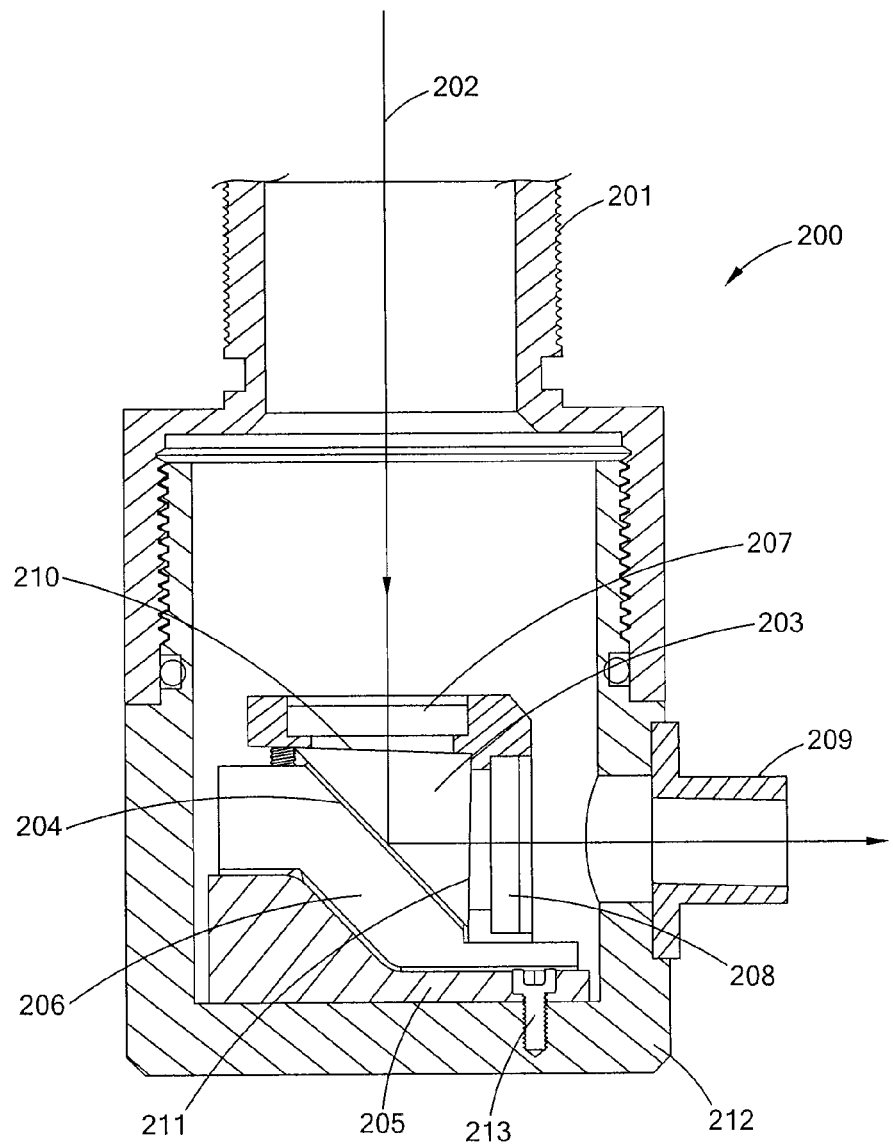
FIG. 2 is a cross sectional view of an embodiment of a TIR laser tool head in accordance with the present invention.

Turning to the embodiment of FIG. 2, there is shown a cross section of a laser tool head having a TIR structure. The laser tool head 200 has beam tube 201 that is secured to a housing 212 by way of a threaded connection. The beam tube 201 has a cavity through which the laser beam path 202, and the laser beam along that path, travels. The beam tube also conveys the fluid that is used to provide the TIR effect and to form a fluid laser jet. The TIR prism 203 has a first AR coated surface 210, a TIR surface 204, and a third AR coated surface 211. The TIR prism 203 is held in position by prism mount 205 that is secured to housing 212 by setscrew 213. Mount 205 holds windows 207 and 208. Mount 205 has a fluid flow passage 206 that is formed against the TIR surface 204. Thus, a wall, or inner surface, of the fluid flow passage 206 is the TIR surface 204. In this manner a fluid having an index of refraction $n_2$, which is lower than the index of refraction $n_1$ of the prism material is maintained in contact with the TIR surface 204. The prism in this embodiment is made from fused silica. The housing 212 has a nozzle for providing a jet of the fluid, which jet surrounds the laser beam path.

Example 2

Figure 3:
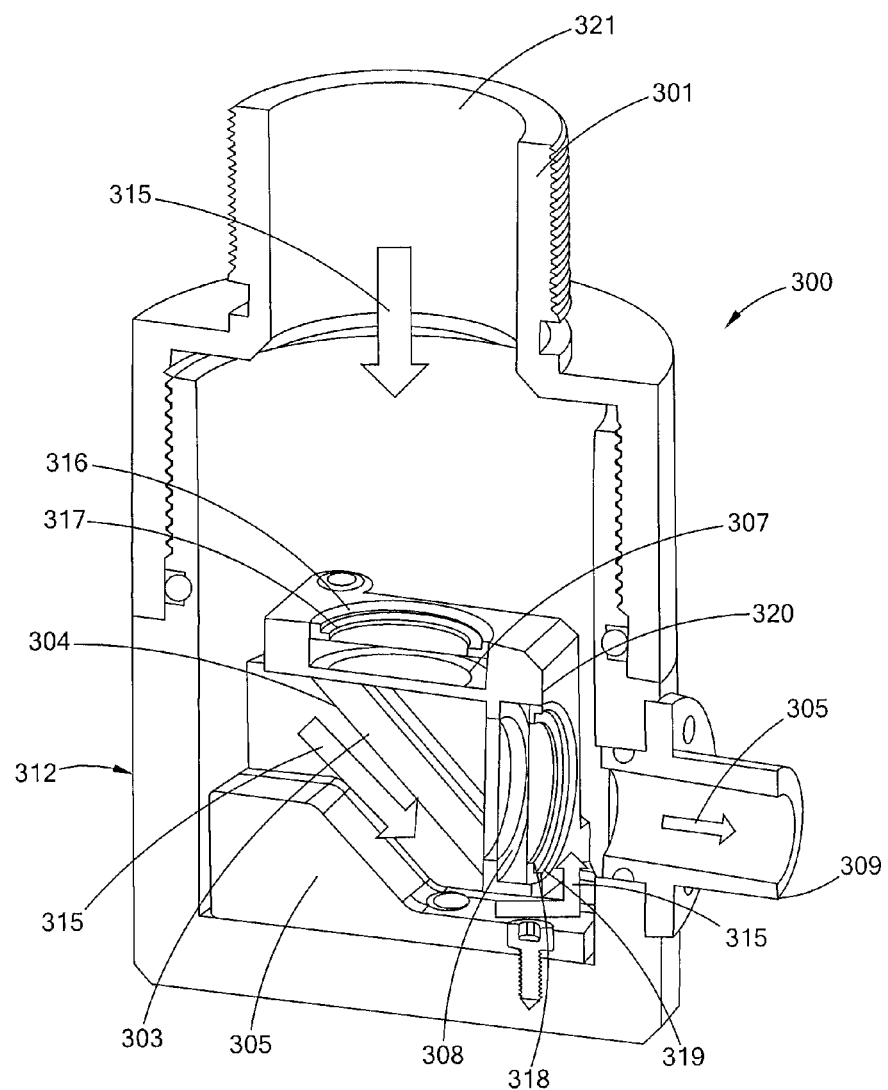
FIG. 3 is a cross sectional perspective view of an embodiment of a TIR laser tool head in accordance with the present invention.

Turning to FIG. 3 there is provided a perspective cross-sectional view of an embodiment of a TIR laser head having a 2-degree from horizontal exiting beam path. The laser tool head 300 has a beam tube 301 having a cavity 321 for transmitting the laser beam along a laser beam path and for transmitting the fluid having an index of refraction lower than the index of refraction of the prism material. The beam tube 301 is attached to a housing 312. In this embodiment the fluid is air and the prism is made from sapphire. The flow of air through the laser tool head 300 is shown by arrows, e.g., 315. The TIR prism 303 is a 90-degree prism and is held in a prism clamp 320. The prism clamp 320 has topside (or inlet) window 307 that is held in place by a retainer ring 316 and a wave spring 317. The topside window 307 receives the laser beam from the beam tube 301 and transmits the laser beam to the TIR prism 303. The prism clamp 320 has a side (or outlet) window 308 that is held in place by a retainer ring 319 and a wave spring 318. The prism clamp 320 is attached to the prism holder 305, which is attached to the housing 312. The TIR prism 303 has a TIR surface 304. The prism is held at a 1 degree tilt with respect to the axis of the tool; providing for a 92 degree change in the laser beam path. A nozzle 309 is attached to the housing 312.

Example 3

Figures 4A, 4B:
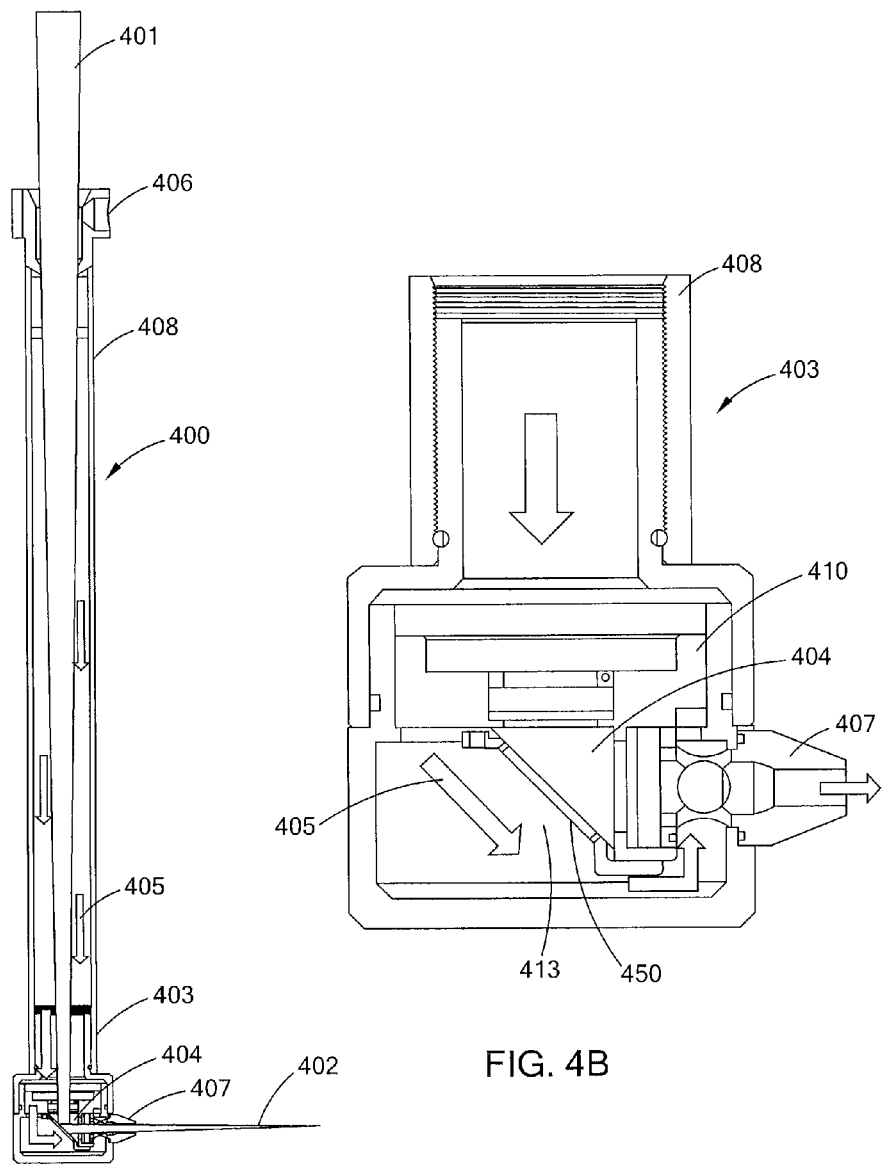
FIG. 4A is a cross sectional view of an embodiment of a TIR laser tool in accordance with the present invention.
FIG. 4B is a cross sectional view of the TIR laser head of the TIR laser tool of FIG. 4A.
Figure 4C:
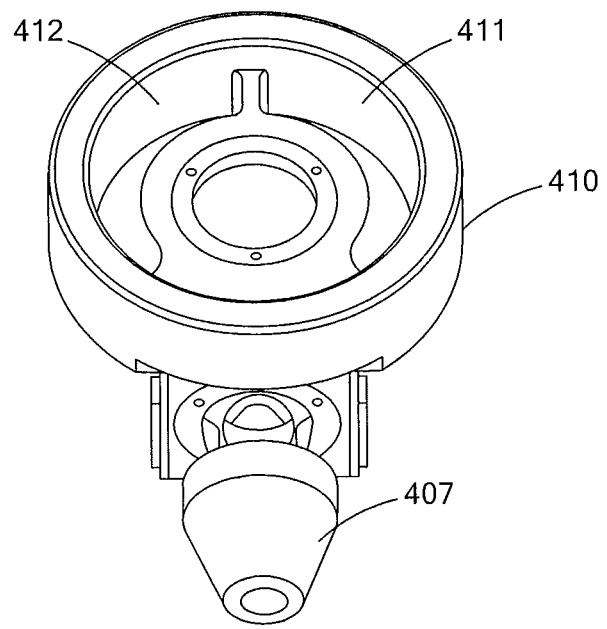
FIGS. 4C and 4D are prospective views of the TIR prism holder of the TIR laser tool of FIG. 4A.
Figure 4D:
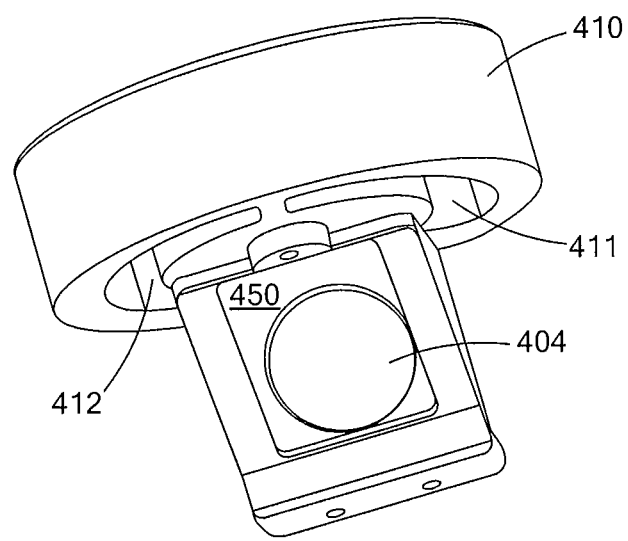

Turning to FIGS. 4A to 4D there is provided an embodiment of a TIR laser tool. In FIG. 4A there is shown a cross-sectional view of a TIR laser tool 400. The laser beam 401 is focused (by focusing optics not shown in the FIG.) to a focal point 402. The laser tool 400 has a beam tube 408 and a laser tool head 403 having a TIR prism 404. The fluid, e.g., air, flow path is shown by the arrows, e.g., 405. Thus, in this embodiment a focused laser beam is being directed into the TIR prism. Although shown in this embodiment as being after the TIR prism, the focal point may also be before or in the TIR prism. The tool 400 has a fluid inlet 406. The laser tool head 403 has a nozzle 407 for forming a laser-fluid jet. The laser tool head 403 has a prism holder 410 having channels 411, 412. In this manner the laser beam 401 is transmitted through the fluid in the beam tube 408. The fluid is then routed by the channels 411, 412 to a flow channel 413 along the TIR side 450 of the TIR prism 404 and then back around, to be recombined with the laser beam 401 in the nozzle 407.

Example 3A

In the embodiment of FIG. 4, the laser beam has a spot size on the first face of the TIR structure of about 2 cm$^2$, has a wavelength of about 1070 nm, and has a power of 20 kW.

Example 3B

In the embodiment of FIG. 4, the laser beam has a spot size on the first face of the TIR structure of about 0.08 cm$^2$, has a wavelength of about 1070 nm, and has a power of 20 kW.

Example 3C

In the embodiment of FIG. 4, the laser beam has a spot size on the first face of the TIR structure of about 0.5 cm$^2$, has a wavelength of about 1070 nm, and has a power of 15 kW.

Example 4

Figures 5A, 5B, 5C:
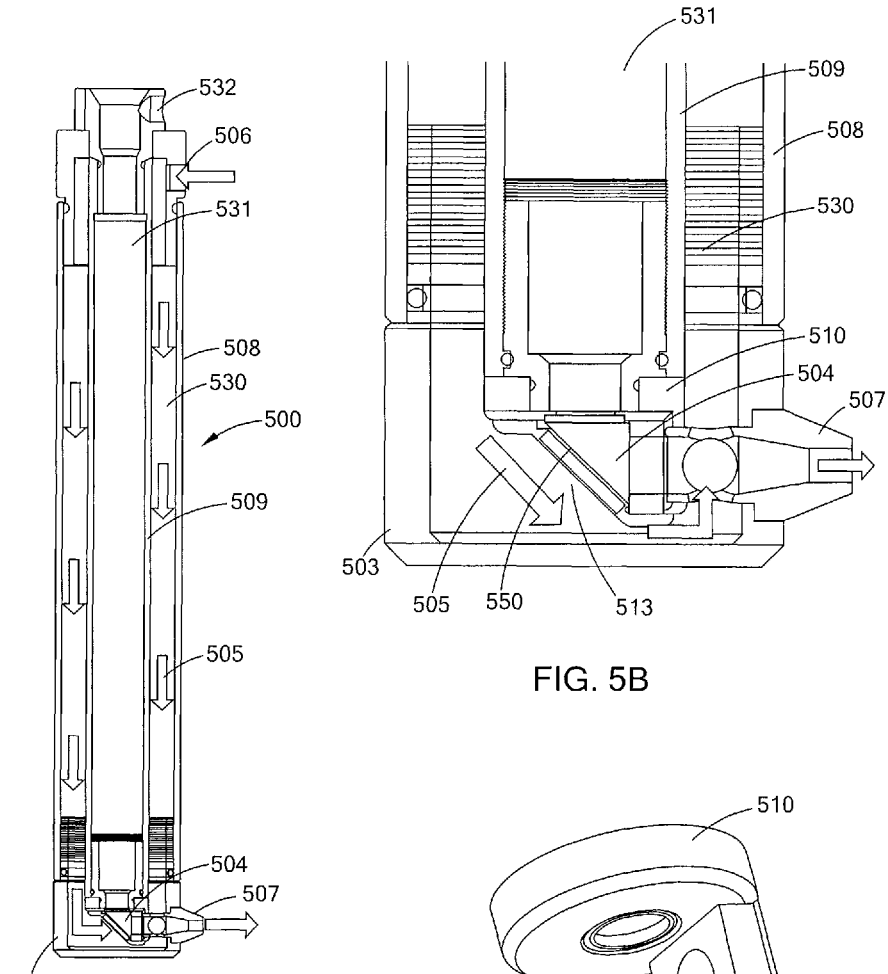
FIG. 5A is a cross sectional view of an embodiment of a TIR laser tool in accordance with the present invention.
FIG. 5B is a cross sectional view of the TIR laser head of the TIR laser tool of FIG. 5A.
FIG. 5C is a prospective view of the TIR prism holder of the TIR laser tool of FIG. 5A.

Turning to FIGS. 5A to 5C there is provided an embodiment of a TIR laser tool. In FIG. 5A there is shown a cross-sectional view of a TIR laser tool 500. In FIG. 5B there is shown a more detailed cross-sectional view of the tool head 503; and in FIG. 5c there is shown a more detailed perspective view of the prism holder 510. The laser tool 500 has an outer beam tube 508 and a laser tool head 503 having a TIR prism 504. The outer beam tube 508 has an inner beam tube 509. Inner beam tube 509 forms a cavity 531, through which the laser beam along a laser beam path is transmitted to the TIR prism 504. Inner beam tube 509 and outer beam tube 508 form an annular cavity 530 through which the fluid, e.g., air, flows along a flow path as shown by the arrows, e.g., 505. The tool 500 has a fluid inlet 506. The inner beam tube 509 has an inlet 532, which may be used for a purge gas, to pressurize the inner beam tube 509 and both. The laser tool head 503 has a nozzle 507 for forming a laser-fluid jet. The laser tool head 503 has a prism holder 510 that is preferably in sealing engagement with the bottom of inner beam tube 509. In this manner the laser beam and the fluid are transmitted to the laser head 503 in separate cavities 530, 531. Thus, the laser beam is not transmitted through the fluid in the laser beam tube. The fluid is then routed by a flow channel 513 along the TIR side 550 of the TIR prism 504 and then back around, to be combined for the first time with the laser beam in the nozzle 507.

Example 5

Figure 6:
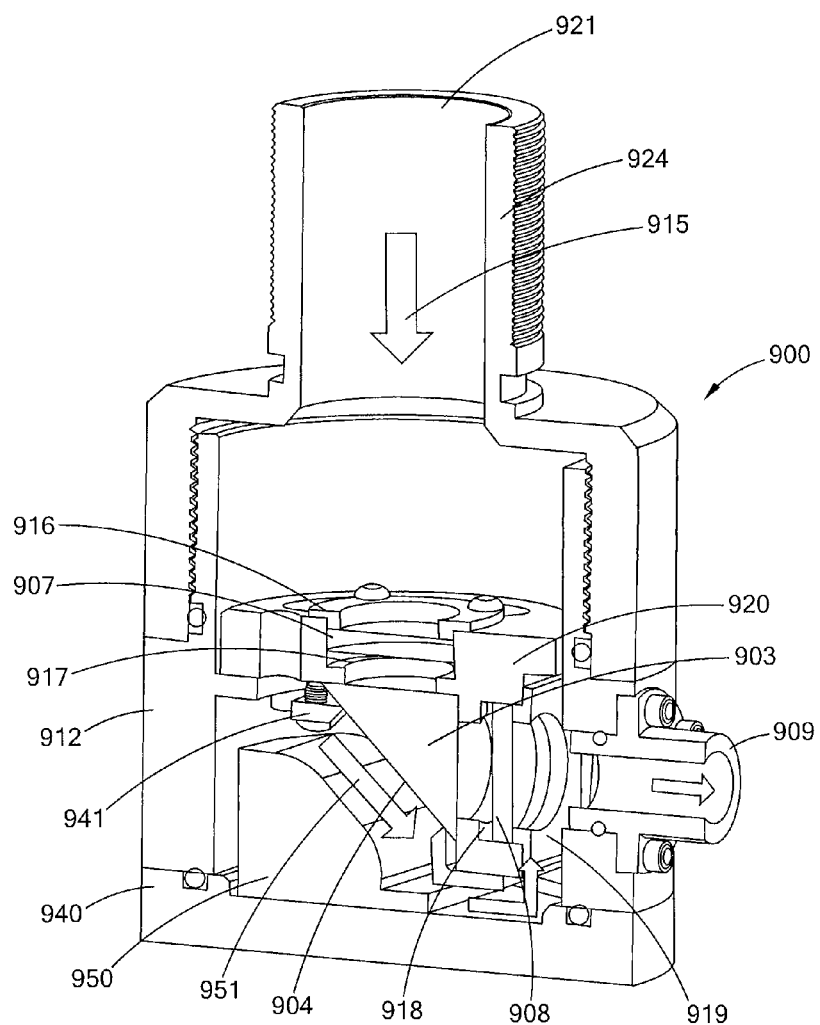
FIG. 6 is a cross sectional perspective view of an embodiment of a TIR laser head in accordance with the present invention.

Turning to FIG. 6 there is provided a perspective cross-sectional view of an embodiment of a TIR laser head having a 0-degree from horizontal exiting beam path. The laser tool head 900 has a beam tube 901 having a cavity 921 for transmitting the laser beam along a laser beam path and for transmitting the fluid having an index of refraction lower than the index of refraction of the prism material. The beam tube 901 is attached to a housing 912, having a removable bottom cap 940. In this embodiment the fluid is air and the prism is made from fused silica. The flow of air through the laser tool head 900 is shown by arrows, e.g., 915. The TIR prism 903 is a 90-degree prism and is held in a prism mount 920, and is retained in mount 920 by clip 941. The prism mount 920 has topside (or inlet) window 907 that is held in place by a retainer ring 916 and a wave spring 917. The topside window 907 receives the laser beam from the beam tube 901 and transmits the laser beam to the TIR prism 903. The prism mount 920 has a side (or outlet) window 908 that is held in place by a retainer ring 919 and a wave spring 918. The prism mount 920 is attached to the housing 912. The TIR prism 903 has a TIR surface 904. The prism is held at a 0 degree tilt with respect to the axis of the tool; providing for a 90 degree change in the laser beam path. A nozzle 909 is attached to the housing 912. The axis of the nozzle is at 90 degrees to the axis of the tool and the laser beam path, and thus the tilt of the nozzle would be 0 degrees. An air block 950 is positioned in the flow channel 951 adjacent the TIR surface 904. The air block is shaped to reduce dead, stagnant or back flow areas of flow next to the TIR surface 904. The air block can have many shapes, that are for example designed to increase the flow rate or velocity of the fluid as it moves past the TIR surface 904.

Example 8

The embodiment of FIG. 6 is adjusted to have the prism at a 1 degree tilt. Providing for a change in beam direction of 92 degrees. The 90 degree nozzle is replaced with a 92 degree nozzle, and thus providing a downward tilt of 2 degrees.

TIR structures and TIR tools, i.e., a laser tool utilizing a TIR structure, may find applications in activities such as: off-shore activities; subsea activities; decommissioning structures such as, oil rigs, oil platforms, offshore platforms, factories, nuclear facilities, nuclear reactors, pipelines, bridges, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; window cutting; well decommissioning; well workover; precise and from a distance in-place milling and machining; heat treating; drilling and advancing boreholes; workover and completion; flow assurance; and, combinations and variations of these and other activities and operations. A preferred application for TIR laser tools is generally in internal bore processing applications, such as perforating or window cutting, by providing benefits for, among other things, making about right angle bends in the laser beam path within the restricted space of a borehole.

A single high power laser may be utilized in the system, tools and operations, or there may be two or three high power lasers, or more. High power solid-state lasers, specifically semiconductor lasers and fiber lasers are preferred, because of their short start up time and essentially instant-on capabilities. The high power lasers for example may be fiber lasers, disk lasers or semiconductor lasers having 5 kW, 10 kW, 20 kW, 50 kW, 80 kW or more power and, which emit laser beams with wavelengths in the range from about 455 nm (nanometers) to about 2100 nm, preferably in the range about 400 nm to about 1600 nm, about 400 nm to about 800 nm, 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers). An example of this general type of fiber laser is the IPG YLS-20000. The detailed properties of which are disclosed in US patent application Publication Number 2010/0044106. Thus, by way of example, there is contemplated the use of four, five, or six, 20 kW lasers to provide a laser beam having a power greater than about 60 kW, greater than about 70 kW, greater than about 80 kW, greater than about 90 kW and greater than about 100 kW. One laser may also be envisioned to provide these higher laser powers.

The various embodiments of TIR structures and tools set forth in this specification may be used with various high power laser systems and conveyance structures and systems, in addition to those embodiments of the Figures and Examples in this specification. For example, embodiments of TIR structures may be used for, in, or with, the systems, lasers, tools and methods disclosed and taught in the following US patent applications and patent application publications: Publication No. 2010/0044106; Publication No. 2010/0215326; Publication No. 2012/0275159; Publication No. 2010/0044103; Publication No. 2012/0267168; Publication No. 2012/0020631; Publication No. 2013/0011102; Publication No. 2012/0217018; Publication No. 2012/0217015; Publication No. 2012/0255933; Publication No. 2012/0074110; Publication No. 2012/0068086; Publication No. 2012/0273470; Publication No. 2012/0067643; Publication No. 2012/0266803; Ser. No. 61/745,661; and Ser. No. 61/727,096, the entire disclosure of each of which are incorporated herein by reference.

Embodiments of TIR structures may also be used with: other high power laser systems that may be developed in the future; and with existing non-high power laser systems, which may be modified, in-part, based on the teachings of this specification, to create a high power laser system. Further, the various embodiments of devices systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A total internal reflection high power laser tool, for use in hydrocarbon exploration, hydrocarbon production or the decommissioning of hydrocarbon wells, the tool comprising:
   a. a beam tube, defining a tool axis, the beam tube comprising a laser beam path for transmitting a laser beam within the beam tube and a fluid path for transmitting a fluid;
   b. a housing in fluid communication with the beam tube, the housing comprising a single and unitary total internal reflection polyhedron structure comprised of a material transmissive to the laser beam; and, a passage defined in part by a total internal reflection surface of the total internal reflection polyhedron structure, the passage in fluid communication with the beam tube fluid path and removed from the laser beam path;
   c. the laser beam path extending through a first surface of the total internal reflection polyhedron structure and into the material;
   d. the laser beam path extending to and from the total internal reflection surface and forming an angle of incidence $\theta_i$ on the total internal reflection surface that is greater than a critical angle $\theta_c$ for the total internal reflection surface; whereby the laser beam traveling along the laser beam path is reflected within the total internal reflection structure by total internal reflection from the total internal reflection surface; and
   e. the laser beam path extending from the total internal reflection material and exiting the housing along a straight path; the exiting laser beam path forming an angle of about 90° or less with the beam tube axis.

2. The high power laser tool of claim 1, wherein the beam tube defines a beam tube passage and wherein the fluid and laser beam path are within the beam tube passage, whereby the laser beam is transmitted through the fluid in the beam tube passage.

3. The high power laser tool of claim 1, wherein the total internal reflection structure is a right angle prism having a hypotenuse comprising the total internal reflection surface.

4. The high power laser tool of claim 1, wherein the fluid has an index of refraction of $n_2$ and the material has an index of refraction of $n_1$, and wherein $n_1$ is greater than $n_2$.

5. The high power laser tool of claim 4, wherein the total internal reflection structure is a right angle prism having a hypotenuse and the total internal reflection surface is the hypotenuse.

6. The high power laser tool of claim 4, wherein the housing comprises a nozzle and the laser beam path from the total internal reflection surface extends through the nozzle.

7. The high power laser tool of claim 6, wherein the total internal reflection structure has a tilt of x degrees and the nozzle has tilt of two times 2x degrees.

8. The high power laser tool of claim 7, wherein x is 1.

9. The high power laser tool of claim 7, wherein the total internal reflection structure is a right angle prism having a hypotenuse comprising the total internal reflection surface.

10. A total internal reflection high power laser head for use with a high power laser tool, in hydrocarbon exploration, hydrocarbon production or the decommissioning of hydrocarbon wells, the laser head comprising:
    a. the laser head defining a laser head axis; a total internal reflection structure comprising a first face, a second face and a third face and having an index of refraction $n_1$ for a laser beam having predetermined beam parameters, the total internal reflection structure defining a total internal reflection structure axis;
    b. a laser beam path along which the laser beam travels, the laser beam path parallel with the laser head axis extending through the first face, to the second face and through the third face; wherein the total internal reflection structure axis is at least 1° different than the laser head axis, and wherein the laser beam path through the third face forms an angle with the laser beam path through the first face of from about 87° to about 93°;
    c. the second face comprising a total internal reflection surface; and,
    d. a fluid flow passage adjacent to the second face.

11. The total internal reflection high power laser head of claim 10, wherein the laser beam has a spot size on the first face of less than about 4 cm².

12. The total internal reflection high power laser head of claim 10, comprising a mount, the mount comprising a top window and a side window; a first wall and a second wall defining a channel; the channel containing a material having an index of refraction of $n_2$ for the laser beam; the material in optical contact with the total internal reflection surface, wherein in $n_1$ is greater than $n_2$.

13. The total internal reflection high power laser head of claim 10, wherein the total internal reflection surface has a critical angle $\theta_c$ and the laser beam path forms an angle of incidence $\theta_i$ with the total internal reflection surface; and wherein $\theta_i$ is greater than $\theta_c$.

14. The high power laser tool of claim 10, wherein the total internal reflection structure is a right angle prism having a hypotenuse comprising the total internal reflection surface.

15. The total internal reflection high power laser head of claim 14, wherein the material is a air.

16. The total internal reflection high power laser head of claim 10, comprising a prism mount, the prism mount comprising a top window and a side window; a first wall and a second wall defining a channel; wherein the second wall comprises the second face; the channel containing a material having an index of refraction of $n_2$ for the laser beam; and the material in optical contact with the total internal reflection surface.

17. The total internal reflection high power laser head of claim 16, wherein $n_1$ is greater than $n_2$ and the material is a gas.

18. The total internal reflection high power laser head of claim 10, wherein the laser beam parameters comprise a wavelength of from about 400 nm to about 1,600 nm and a power of at least about 10 kW.

19. The total internal reflection high power laser head of claim 18, wherein the laser beam has a spot size on the first face of less than about 2 cm$^2$.

20. The total internal reflection high power laser head of claim 18, wherein the laser beam has a power of at least about 20 kW and the spot size on the first face is from about 0.5 cm$^2$ to about 0.08 cm$^2$.

21. The total internal reflection high power laser head of claim 20, wherein the material is a gas.

22. The total internal reflection high power laser head of claim 18, wherein the laser beam has a power of at least about 20 kW and wherein the laser beam has a spot size on the first face of at least about 0.08 cm$^2$.

23. The total internal reflection high power laser head of claim 22, wherein the material is a fluid.

24. The total internal reflection high power laser head of claim 22, wherein the total internal reflection surface has a critical angle $\theta_c$ and the laser beam path forms an angle of incidence $\theta_i$ with the total internal reflection surface; and wherein $\theta_i$ is greater than $\theta_c$.

25. A method of directing a high power laser beam within a laser tool, for use in hydrocarbon exploration, hydrocarbon production or the decommissioning of hydrocarbon wells, the method comprising:
   a. directing a laser beam along a beam path to a first surface of a unitary total internal reflection structure in a laser tool;
   b. the laser beam traveling along the laser beam path entering the unitary total internal reflection structure through the first surface and traveling along the laser beam path within the total internal reflection structure to a second surface of the total internal reflection structure;
   c. the laser beam being reflected by total internal reflection from the second surface and traveling along the laser beam path within the total internal reflection structure to a third surface of the total internal reflection structure;
   d. directing the laser beam along the laser beam path from the laser tool; and,
   e. wherein the laser travels along a beam tube, the beam tube comprising a laser beam path for transmitting a laser beam within the beam tube and a fluid path for transmitting a fluid.

26. The method of claim 25, wherein the total internal reflection structure has an index of refraction for the laser beam of $n_1$; and comprising providing a fluid having an index of refraction of $n_2$ adjacent to the second surface, wherein $n_1$ is greater than $n_2$.

27. The method of claim 25, wherein the laser beam is transmitted through the fluid as the laser beam is directed from the laser tool.

28. The method of claim 27, wherein the laser beam is transmitted through the fluid as the laser beam is directed to the total internal reflection structure.

29. A total internal reflection high power laser tool, for use in hydrocarbon exploration, hydrocarbon production or the decommissioning of hydrocarbon wells, the tool comprising:
   a. a beam tube, defining a tool axis, the beam tube comprising a laser beam path for transmitting a laser beam within the beam tube and a fluid path for transmitting a fluid;
   b. a housing in fluid communication with the beam tube, the housing comprising a single and unitary total internal reflection polyhedron structure comprised of a material transmissive to the laser beam; and, a passage defined in part by a total internal reflection surface of the total internal reflection polyhedron structure, the passage in fluid communication with the beam tube fluid path and removed from the laser beam path;
   c. the laser beam path extending through a first surface of the total internal reflection polyhedron structure and into the material;
   d. the laser beam path extending to and from the total internal reflection surface and forming an angle of incidence $\theta_i$ on the total internal reflection surface that is greater than a critical angle $\theta_c$ for the total internal reflection surface; whereby the laser beam traveling along the laser beam path is reflected within the total internal reflection structure by total internal reflection from the total internal reflection surface; and,
   e. the laser beam path extending from the total internal reflection material and exiting the housing along a straight path; the exiting laser beam path forming an angle of about 90° or greater with the beam tube axis.

* * * * *